(12) United States Patent
Leser et al.

(10) Patent No.: US 9,758,293 B2
(45) Date of Patent: *Sep. 12, 2017

(54) INSULATIVE CONTAINER

(71) Applicant: Berry Plastics Corporation, Evansville, IN (US)

(72) Inventors: Chris K Leser, Mahomet, IL (US); Charles T Wallace, Evansville, IN (US); Philip A Driskill, Newburgh, IN (US); John B Euler, Evansville, IN (US); Jason J Paladino, Newburgh, IN (US); Milan C Maravich, Newburgh, IN (US); Daniel O Davis, Cynthiana, IN (US); Jeffrey A Mann, Evansville, IN (US); Randy A. Bowlds, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,657

(22) Filed: Apr. 25, 2016

(65) Prior Publication Data

US 2016/0236851 A1    Aug. 18, 2016

Related U.S. Application Data

(63) Continuation of application No. 14/755,546, filed on Jun. 30, 2015, now Pat. No. 9,346,605, which is a (Continued)

(51) Int. Cl.
*B32B 1/08* (2006.01)
*B65D 81/38* (2006.01)
(Continued)

(52) U.S. Cl.
CPC ..... *B65D 81/3879* (2013.01); *A47G 19/2205* (2013.01); *B29C 66/1122* (2013.01);
(Continued)

(58) Field of Classification Search
CPC .... B32B 1/00; B32B 1/02; B32B 1/08; B32B 27/08; B32B 27/32; B65D 81/3865;
(Continued)

(56) References Cited

U.S. PATENT DOCUMENTS 1,396,282 A    11/1921  Penn
1,435,120 A    11/1922  Holman
(Continued)

FOREIGN PATENT DOCUMENTS

CA    2291607    6/2000
CA    2765489    12/2010
(Continued)

OTHER PUBLICATIONS

Office Action dated Sep. 1, 2016 for U.S. Appl. No. 14/106,212.
(Continued)

*Primary Examiner* — Walter B Aughenbaugh
(74) *Attorney, Agent, or Firm* — Barnes & Thornburg LLP

(57) ABSTRACT

An insulated sleeve is provided to be coupled to an outer surface of a cup. The sleeve is formed from an insulative cellular non-aromatic polymeric material having an area of plastic deformation. There are no fractures in the insulative cellular non-aromatic polymeric material so that a predetermined insulative characteristic is maintained in the material.

28 Claims, 21 Drawing Sheets

Related U.S. Application Data continuation of application No. 13/526,417, filed on Jun. 18, 2012, now Pat. No. 9,102,461.

(60) Provisional application No. 61/498,415, filed on Jun. 17, 2011, provisional application No. 61/618,037, filed on Mar. 30, 2012.

(51) Int. Cl.
    B65D 85/00       (2006.01)
    B32B 27/08       (2006.01)
    B32B 1/00        (2006.01)
    B32B 27/32       (2006.01)
    A47G 19/22       (2006.01)
    B29C 65/00       (2006.01)
    B29L 31/00       (2006.01)
    B29C 65/02       (2006.01)

(52) U.S. Cl.
    CPC .... *B29C 66/1282* (2013.01); *B29C 66/12881* (2013.01); *B29C 66/14* (2013.01); *B29C 66/4322* (2013.01); *B29C 66/727* (2013.01); *B32B 1/00* (2013.01); *B32B 1/08* (2013.01); *B32B 27/08* (2013.01); *B32B 27/32* (2013.01); *B65D 81/3867* (2013.01); *B65D 81/3876* (2013.01); *B65D 81/3881* (2013.01); *B29C 65/02* (2013.01); *B29C 66/71* (2013.01); *B29C 66/73713* (2013.01); *B29L 2031/7132* (2013.01); *B31B 2203/062* (2013.01); *B31B 2203/064* (2013.01); *B31B 2203/082* (2013.01); *B31B 2217/062* (2013.01); *B31B 2217/064* (2013.01); *B31B 2217/082* (2013.01); *Y10T 428/139* (2015.01); *Y10T 428/1376* (2015.01); *Y10T 428/1393* (2015.01)

(58) Field of Classification Search
    CPC ............ B65D 81/3867; B65D 81/3874; B65D 81/3876; B65D 81/3879; B65D 81/3881; Y10T 428/1352; Y10T 428/1376
    See application file for complete search history.

(56) References Cited

U.S. PATENT DOCUMENTS

| | | |
|---|---|---|
| 1,920,529 A | 8/1933 | Sidebotham |
| 1,969,030 A | 8/1934 | Page |
| 2,097,899 A | 12/1935 | Smith |
| 2,103,831 A | 12/1937 | Sidon |
| 2,809,776 A | 3/1956 | Barrington |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Gilbert |
| 3,443,715 A | 5/1969 | Edwards |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,733,381 A | 5/1973 | Willette |
| 3,793,283 A | 2/1974 | Frailey |
| 3,846,349 A | 11/1974 | Harada |
| 3,907,193 A | 9/1975 | Heller |
| 3,919,368 A | 11/1975 | Seto |
| RE28,658 E | 12/1975 | Macdaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |
| 4,197,948 A | 4/1980 | Amberg |
| 4,240,568 A | 12/1980 | Pool |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,490,130 A | 12/1984 | Konzal |
| 4,550,046 A | 10/1985 | Miller |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,878,970 A | 11/1989 | Schubert |
| 4,918,112 A | 4/1990 | Roox |
| 4,940,736 A | 7/1990 | Alteepping |
| 5,078,817 A | 1/1992 | Takagaki |
| 5,116,881 A * | 5/1992 | Park .................. C08J 9/12 264/321 |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,348,795 A | 9/1994 | Park |
| 5,366,791 A | 11/1994 | Carr |
| 5,385,260 A | 1/1995 | Gatcomb |
| 5,443,769 A | 8/1995 | Karabedian |
| 5,445,315 A * | 8/1995 | Shelby ................ B65D 5/3628 220/592.17 |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,866,053 A | 2/1999 | Park |
| 5,868,309 A | 2/1999 | Sandstrom |
| 5,895,614 A | 4/1999 | Rivera |
| 5,925,450 A | 7/1999 | Karabedian |
| 5,928,741 A | 7/1999 | Andersen |
| 5,944,225 A | 8/1999 | Kawolics |
| 5,948,839 A | 9/1999 | Chatterjee |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,071,580 A | 6/2000 | Bland |

(56) References Cited

U.S. PATENT DOCUMENTS

| | | |
|---|---|---|
| 6,077,878 A | 6/2000 | Okura |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,218,023 B1 | 4/2001 | DeNicola |
| 6,225,366 B1 | 5/2001 | Raetzsch |
| 6,231,942 B1 | 5/2001 | Blizard |
| 6,235,380 B1 | 5/2001 | Tupil |
| 6,251,319 B1 | 6/2001 | Tusim |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,420,024 B1 | 7/2002 | Perez |
| 6,444,073 B1 | 9/2002 | Reeves |
| 6,455,150 B1 | 9/2002 | Sheppard |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |
| 6,811,843 B2 * | 11/2004 | DeBraal ............. B29C 47/0021 220/592.25 |
| 6,814,253 B2 | 11/2004 | Wong |
| 6,875,826 B1 | 4/2005 | Huovinen |
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,926,507 B2 | 8/2005 | Cardona |
| 6,926,512 B2 | 8/2005 | Wu |
| 6,982,107 B1 | 1/2006 | Hennen |
| 7,056,563 B2 | 6/2006 | Halabisky |
| 7,070,852 B1 | 7/2006 | Reiners |
| 7,074,466 B2 | 7/2006 | DeBraal |
| 7,094,463 B2 | 8/2006 | Haas |
| 7,121,991 B2 | 10/2006 | Mannlein |
| 7,144,532 B2 | 12/2006 | Kim |
| 7,173,069 B2 | 2/2007 | Swennen |
| 7,234,629 B2 | 6/2007 | Ho |
| 7,281,650 B1 | 10/2007 | Milan |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,404 B2 | 7/2010 | Burgun |
| 7,786,216 B2 | 8/2010 | Soediono |
| 7,795,321 B2 | 9/2010 | Cheung |
| 7,803,728 B2 | 9/2010 | Poon |
| 7,811,644 B2 | 10/2010 | DeBraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,928,162 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,234 B2 | 2/2012 | Weaver |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |

(56) References Cited

U.S. PATENT DOCUMENTS

| | | |
|---|---|---|
| 8,304,496 B2 | 11/2012 | Weaver |
| 8,404,780 B2 | 3/2013 | Weaver |
| 8,435,615 B2 | 5/2013 | Tsuchida |
| 8,679,620 B2 | 3/2014 | Matsushita |
| 8,715,449 B2 | 5/2014 | Leser |
| 8,721,823 B2 | 5/2014 | Vaideeswaran |
| 8,883,280 B2 | 11/2014 | Leser |
| 9,067,705 B2 | 6/2015 | Leser |
| 9,102,461 B2 * | 8/2015 | Leser .............. B65D 81/3876 |
| 9,180,995 B2 | 11/2015 | Iyori |
| 9,358,772 B2 | 6/2016 | Leser |
| 2001/0010848 A1 | 8/2001 | Usui |
| 2001/0010849 A1 | 8/2001 | Blizard |
| 2001/0038893 A1 | 11/2001 | Mohan |
| 2001/0041236 A1 | 11/2001 | Usui |
| 2002/0030296 A1 | 3/2002 | Geddes |
| 2002/0041046 A1 | 4/2002 | Hartjes |
| 2002/0058126 A1 | 5/2002 | Kannankeril |
| 2002/0135088 A1 | 9/2002 | Harfmann |
| 2002/0137851 A1 | 9/2002 | Kim |
| 2002/0144769 A1 | 10/2002 | Debraal |
| 2002/0172818 A1 | 11/2002 | DeBraal |
| 2003/0003251 A1 | 1/2003 | DeBraal |
| 2003/0017284 A1 | 1/2003 | Watanabe |
| 2003/0021921 A1 | 1/2003 | DeBraal |
| 2003/0029876 A1 | 2/2003 | Giraud |
| 2003/0108695 A1 | 6/2003 | Freek |
| 2003/0138515 A1 | 7/2003 | Harfmann |
| 2003/0211310 A1 | 11/2003 | Haas |
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0038018 A1 | 2/2004 | Anderson |
| 2004/0062885 A1 | 4/2004 | Imanari |
| 2004/0115418 A1 | 6/2004 | Anderson |
| 2004/0170814 A1 | 9/2004 | VanHandel |
| 2005/0003122 A1 | 1/2005 | Debraal |
| 2005/0006449 A1 | 1/2005 | DAmato |
| 2005/0040218 A1 | 2/2005 | Hinchey |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0094577 A1 | 5/2006 | Mannlein |
| 2006/0095151 A1 | 5/2006 | Mannlein |
| 2006/0108409 A1 | 5/2006 | Pyper |
| 2006/0135699 A1 | 6/2006 | Li |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | LiPiShan |
| 2008/0020162 A1 | 1/2008 | Fackler |
| 2008/0045638 A1 | 2/2008 | Chapman |
| 2008/0118738 A1 | 5/2008 | Boyer |
| 2008/0121681 A1 | 5/2008 | Wiedmeyer |
| 2008/0138593 A1 | 6/2008 | Martinez |
| 2008/0156857 A1 | 7/2008 | Johnston |
| 2008/0177242 A1 | 7/2008 | Chang |
| 2008/0227877 A1 | 9/2008 | Stadlbauer |
| 2008/0234435 A1 | 9/2008 | Chang |
| 2008/0260996 A1 | 10/2008 | Heilman |
| 2008/0269388 A1 | 10/2008 | Markovich |
| 2008/0280517 A1 | 11/2008 | Chang |
| 2008/0281037 A1 | 11/2008 | Karjala |
| 2008/0311812 A1 | 12/2008 | Arriola |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |
| 2009/0220711 A1 | 9/2009 | Chang |
| 2009/0247033 A1 | 10/2009 | Peng |
| 2009/0263645 A1 | 10/2009 | Barger |
| 2009/0275690 A1 | 11/2009 | Weaver |
| 2009/0324914 A1 | 12/2009 | Liang |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0108695 A1 | 5/2010 | Zhang |
| 2010/0116422 A1 | 5/2010 | Vaideeswaran |
| 2010/0137118 A1 | 6/2010 | Chang |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0240818 A1 | 9/2010 | Walton |
| 2010/0279571 A1 | 11/2010 | Poon |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |

(56) References Cited

U.S. PATENT DOCUMENTS

| | | |
|---|---|---|
| 2011/0118370 A1 | 5/2011 | Jiang |
| 2011/0118416 A1 | 5/2011 | Arriola |
| 2011/0124818 A1 | 5/2011 | Arriola |
| 2011/0136959 A1 | 6/2011 | Brandstetter |
| 2011/0144240 A1 | 6/2011 | Harris |
| 2011/0217492 A1 | 9/2011 | Stamatiou |
| 2011/0229693 A1 | 9/2011 | Maurer |
| 2011/0230108 A1 | 9/2011 | Arriola |
| 2011/0318560 A1 | 12/2011 | Yun |
| 2012/0004087 A1 | 1/2012 | Tharayil |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | VanHorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0032963 A1 | 2/2013 | Tokiwa |
| 2013/0052385 A1 | 2/2013 | Leser |
| 2013/0140320 A1 | 6/2013 | Nadella |
| 2013/0216744 A1 | 8/2013 | Liao |
| 2013/0280517 A1 | 10/2013 | Buehring |
| 2013/0303645 A1 | 11/2013 | Dix |
| 2014/0131430 A1 | 5/2014 | Leser |
| 2014/0263367 A1 | 9/2014 | Robertson |
| 2015/0250342 A1 | 9/2015 | Euler |
| 2015/0258771 A1 | 9/2015 | Leser |

FOREIGN PATENT DOCUMENTS

| | | |
|---|---|---|
| CN | 1288427 | 3/2001 |
| CN | 1495100 | 5/2004 |
| CN | 1942370 | 4/2007 |
| CN | 101370873 | 2/2009 |
| CN | 101429309 | 5/2009 |
| CN | 101531260 | 9/2009 |
| CN | 101538387 | 9/2009 |
| CN | 102089370 | 6/2011 |
| CN | 102115561 | 7/2011 |
| CN | 102245368 | 11/2011 |
| CN | 102391570 | 3/2012 |
| CN | 102762350 | 10/2012 |
| DE | 2831240 | 1/1980 |
| DE | 2831240 C | 3/1988 |
| DE | 102006025612 | 11/2007 |
| DE | 102006025612 A1 | 11/2007 |
| EP | 0001791 | 5/1979 |
| EP | 0086869 | 8/1983 |
| EP | 0161597 | 11/1985 |
| EP | 0318167 | 5/1989 |
| EP | 0520028 | 12/1992 |
| EP | 0570221 | 11/1993 |
| EP | 0588321 | 3/1994 |
| EP | 0659647 | 6/1995 |
| EP | 879844 | 11/1998 |
| EP | 0879844 | 11/1998 |
| EP | 0972727 | 1/2000 |
| EP | 0796199 | 2/2001 |
| EP | 0940240 | 10/2002 |
| EP | 1308263 | 5/2003 |
| EP | 1323779 | 7/2003 |
| EP | 1479716 | 11/2004 |
| EP | 1666530 | 6/2006 |
| EP | 1754744 | 2/2007 |
| EP | 1921023 A1 | 5/2008 |
| EP | 1939099 | 7/2008 |
| EP | 2266894 | 12/2010 |
| EP | 2386584 A1 | 11/2011 |
| EP | 2386601 | 11/2011 |
| EP | 2012099682 | 7/2012 |
| EP | 2720954 | 4/2014 |
| GB | 1078326 | 8/1967 |
| GB | 2485077 | 5/2012 |
| JP | 52123043 | 10/1977 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | H0543967 | 6/1993 |
| JP | 0615751 | 1/1994 |
| JP | 3140847 | 1/1994 |
| JP | 06192460 | 7/1994 |
| JP | H08067758 | 3/1996 |
| JP | 2000128255 | 5/2000 |
| JP | P310847 | 12/2000 |
| JP | 2001310429 | 11/2001 |
| JP | 2001315277 | 11/2001 |
| JP | 2003292663 | 10/2003 |
| JP | 2003321566 | 11/2003 |
| JP | 2004018101 | 1/2004 |
| JP | 2004168421 | 6/2004 |
| JP | 2004168421 A | 6/2004 |
| JP | 2004330464 | 11/2004 |
| JP | 2005272542 | 10/2005 |
| JP | 2006096390 | 4/2006 |
| JP | 2006130814 A | 5/2006 |
| JP | 2006142008 A | 6/2006 |
| JP | 2007154172 | 6/2007 |
| JP | 2009504858 | 2/2009 |
| JP | 2009126922 | 6/2009 |
| JP | 2009138029 | 6/2009 |
| JP | 2009190756 A | 8/2009 |
| JP | 2010173258 | 8/2010 |
| JP | 2011104890 | 6/2011 |
| KR | 100306320 | 10/2001 |
| KR | 2003036558 | 5/2003 |
| KR | 2004017234 | 2/2004 |
| KR | 101196666 | 11/2012 |
| WO | 9113933 | 9/1991 |
| WO | 9413460 | 6/1994 |
| WO | 9729150 | 8/1997 |
| WO | 9816575 | 4/1998 |
| WO | 0002800 | 1/2000 |
| WO | 0119733 | 3/2001 |
| WO | 0132758 | 5/2001 |
| WO | 0153079 | 7/2001 |
| WO | 0234824 | 5/2002 |
| WO | 03076497 | 9/2003 |
| WO | 03099913 | 12/2003 |
| WO | 2004104075 | 12/2004 |
| WO | 2006042908 | 4/2006 |
| WO | 2006124369 | 11/2006 |
| WO | 2007003523 | 1/2007 |
| WO | 2007020074 | 2/2007 |
| WO | 2007068766 | 6/2007 |
| WO | 2007090845 A2 | 8/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008162700 | 7/2008 |
| WO | 2008145267 | 12/2008 |

(56) References Cited

FOREIGN PATENT DOCUMENTS

| | | |
|---|---|---|
| WO | 2009035580 | 3/2009 |
| WO | 2009066856 A | 4/2009 |
| WO | 2010006272 | 1/2010 |
| WO | 2010019146 | 2/2010 |
| WO | 2010076701 A1 | 7/2010 |
| WO | 2010111869 | 10/2010 |
| WO | 2011005856 | 1/2011 |
| WO | 2011036272 A2 | 3/2011 |
| WO | 2011038081 | 3/2011 |
| WO | 2011076637 | 6/2011 |
| WO | 2011141044 | 11/2011 |
| WO | 2012020106 | 2/2012 |
| WO | 2012025584 | 3/2012 |
| WO | 2012044730 | 4/2012 |
| WO | 2012055797 | 5/2012 |
| WO | 2012173873 | 12/2012 |
| WO | 2012174422 | 12/2012 |
| WO | 2012174567 | 12/2012 |
| WO | 2012174568 | 12/2012 |
| WO | 2013032552 | 3/2013 |
| WO | 2013101301 | 7/2013 |
| WS | 2011036272 | 3/2011 |

OTHER PUBLICATIONS

Australian First Patent Examination Report for Application No. 2013359097 sent Aug. 26, 2016, 3 pages.
British Examamination Report for GB Application No. GB1400762.9, sent on Aug. 8, 2016, 2 pages.
Extended European Search Report for European Application No. 13863546.1 established Jul. 12, 2016, 7 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene," Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,319.
Taiwan Office Action for Taiwan Pat. App. No. 102146299, 7 pages.
Third Party Observation filed in European Patent App. No. 12727994.1, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4, 4 pages.
British Examination Report for GB App. No. 1400762.9, 2 pages.
Chinese Office Action for Chinese Applicaiton 201380065781.6, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009.
Extended European Search Report for European App. No. 13863649.3, 9 pages.
Office Action dated Nov. 4, 2016 for U.S. Appl. No. 13/961,411.
Chinese Office Action for Chinese Application No. 201280051426.9, 9 pages.
English Summary of Chinese Office Action for Application Serial No. 201380041896.1, dated Nov. 11, 2016, 11 pages.
Extended European Search Report for European App. No. 14775300.8 sent Oct. 24, 2016, 9 pages.
Office Action dated Nov. 18, 2016 for U.S. Appl. No. 14/718,836.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-usa/products/technical-information-patents/ineos-engineering-properties-of-pp.pdf, Mar. 2016, p. 1.
Office Action dated Dec. 14, 2016 for U.S. Appl. No. 14/211,553.
Office Action dated Dec. 22, 2016 for U.S. Appl. No. 14/858,158.
Gulf Cooperation Council Examination Report for GCC Patent App. No. GC2012-21529, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025, 5 pages.
Japanese Office Action for Japanese Patent App. 2014-516089 sent Dec. 20, 2016, 6 pages.
European Examination Report for European App. No. 12727994.1, 4 pages.
Japanese Office Action for Japanese App. No. 2014-528384, 15 pages.
Singapore Office Action and Written Opinion for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Office Action dated Feb. 15, 2017 for U.S. Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Office Action for Chinese Patent Application No. 201380065116.7, dated Jun. 28, 2016, including English language summary, 12 pages.
Australian First Patent Examination Report for Application No. 2013334155, dated May 23, 2016, 4 pages.
Extended European Search Report for European Application No. 13862331.9-1708 / 2931627 PCT/US2013/074923, dated Jul. 7, 2016.
English translation of Russian Office Action for Application Serial No. 2014101298, dated Jul. 22, 2016, 7 pages.
Office Action dated Jun. 30, 2016 for U.S. Appl. No. 14/106,276.
Australian First Patent Examination Report for Application No. 2012363114, dated Jun. 15, 2016, 4 pages.
Office Action for Chinese Patent Application No. 201380064860.5, dated Jun. 2, 2016 including English language summary, 13 pages.
Singapore Office Action and Written Opinion dated May 26, 2016 for Singapore Application No. 11201504333Y.
Singapore Office Action and Written Opinion dated May 27, 2016 for Singapore Application No. 11201504330U.
Singapore Office Action and Written Opinion dated May 27, 2016 for Singapore Application No. 11201504327V.
Office Action dated Jun. 10, 2016 for U.S. Appl. No. 14/188,504.
Office Action dated Mar. 10, 2016 for U.S. Appl. No. 14/620,073.
Notice of Acceptance dated Jun. 10, 2016 for Australian Application No. 2012302251.
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Borealis AG, DAPLOY(TM) HMS Polypropylene for Foam Extrusion, 2010, 20 pages.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.

(56) References Cited

OTHER PUBLICATIONS

International Search Report and Written Opinion dated Apr. 25, 2014, relating to PCT/US2013/075052.
International Search Report and Written Opinion dated Jan. 19, 2015, relating to International Application No. PCT/US2014/059312.
International Search Report and Written Opinion dated Jul. 3, 2014, relating to International Application No. PCT/US2014/025697.
International Search Report dated Feb. 26, 2013, relating to International Application No. PCT/US2012/043018.
International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.
International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of EP0086869.
Machine English translation of JP 2006-130814.
Naguib et al., "Fundamental Foaming Mechanisms Governing the Volume Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 19, 2014 for Chinese Application No. 201280035667.4.
Office Action dated Aug. 21, 2014 for U.S. Appl. No. 13/526,454.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640.
Office Action dated Oct. 10, 2014 for U.S. Appl. No. 14/106,358.
Office Action dated Oct. 16, 2014 for U.S. Appl. No. 14/106,212.
Office Action dated Sep. 25, 2014 for U.S. Appl. No. 13/526,417.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP\s Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
English translation of Japanese Office Action for Japanese Application No. 2014-516089, dated May 10, 2016.
Inter Partes Review Petition for U.S. Pat. No. 8,883,280 (712 pages) [Submitted in multiple parts].
Borealis webpage dated Jan. 20, 2010 from Internet Archive (6 pages).
Gibson and Ashby, Cellular solids: structure and properties, 2nd ed., Cambridge University Press (1997) (7 pages).
C. Maier and T. Calafut, Polypropylene: the Definitive User\s Guide and Databook, Plastics Design Library, William Andrew Inc. (1998) (19 pages).
Reichelt et al., Cellular Polymers, vol. 22, No. 5 (2003) (14 pages).
Ratzsch et al., Prog. Polym. Sci., 27 (2002), 1195-1282 (88 pages).
Encyclopedia of Polymer Science and Technology: Plastics, Resins, Rubbers, and Fibers, vol. 2, John Wiley & Sons, Inc. (1965) (37 pages).
Shau-Tarng Lee, Chul B. Park, and N.S. Ramesh, Polymer Foams: Science and Technology, CRC Press (2007) (51 pages).
Grant & Hackh\s Chemical Dictionary, 5th ed., McGraw-Hill, Inc. (1987) (3 pages).
Merriam-Webster\s Collegiate Dictionary, 11th ed. (2003), p. 70 (3 pages).
Merriam-Webster\s Collegiate Dictionary, 11th ed. (2003), p. 1237 (3 pages).
Hawley\s Condensed Chemical Dictionary, 14th Ed. (2001) (5 pages).
Reichelt et al., Abstract of PP-Blends with Talored Foamability and Mechanical Properties, Cellular Polymers, (2003) available from http://www.polymerjournals.com/journals.asp?Page=111 &JournalType=cp&JournalIssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly HMS Polypropylene for Foam Extrusion" obtained from Borealis webpage obtained from the Internet Archive\s "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf) ("Brochure \08") (20 pages).
Certified English translation of JP2003292663.
Office Action Chinese Patent Application No. 20128051426.9 dated Jul. 23, 2015.
Office Action dated Aug. 18, 2015 for U.S. Appl. No. 14/106,212.
Office Action dated Aug. 27, 2015 for U.S. Appl. No. 14/106,358.
Office Action dated May 19, 2015 for Chinese Application No. 201280035667.4.
Office Action dated Oct. 27, 2015 for U.S. Appl. No. 14/462,073.
Office Action dated Oct. 8, 2015 for U.S. Appl. No. 14/188,504.
Second Chinese Office Action dated Sep. 6, 2015 for Chinese Application Serial No. 201280034350.9.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
English translation of Russian Office Action for Application Serial No. 2015127677, dated Sep. 16, 2015.
Office Action dated Dec. 31, 2015 for U.S. Appl. No. 14/755,546.
English translation of First Office Action for Taiwanese Application No. 101121656, Nov. 13, 2015.
Singapore Notice of Eligibility for Grant, Search Report, and Examination Report transmitted Dec. 10, 2015 for Singapore Application No. 11201503336V.
Office Action dated Jan. 11, 2016 for U.S. Appl. No. 14/161,328.
English Summary of Russian Office Action for Application Serial No. 2014111340, dated Feb. 25, 2016, 8 pages.

(56) References Cited

OTHER PUBLICATIONS

United Kingdom Examination Report for Patent Application No. GB1400762.9 dated Feb. 11, 2016.
Office Action dated Feb. 16, 2016 for U.S. Appl. No. 14/108,142.
Extended European Search Report for European Application No. 13849152.7-1303 / 2912142 PCT/US2013/066811, dated Feb. 12, 2016.
English summary of Spanish Office Action for Application Serial No. P201490025, Feb. 9, 2016, 8 pages.
Supplemental European Search Report for European Application No. 12727994.1-1302, dated Feb. 17, 2016.
English summary of Chinese Office Action for Chinese Application Serial No. 201380065781.6, Apr. 19, 2016, 14 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daployhmspp-extruded-foam/).
Reichelt et al., "PP-Blends with Tailored Foamability and Mechanical Properties", Cellular Polymers, vol. 22, No. 5, 2003, 14 pages.
Ratzsch et al., "Radical reactions on polypropylene in the solid state", Prog. Polym. Sci. 27 (2002) 1195-1282, 88 pages.
Excerpts from Encyclopedia of Polymer Science and Technology: Plastics, Resins, Rubbers, and Fibers, "Blowing Agents", vol. 2, John Wiley & Sons, Inc. (1965), 37 pages.
Excerpts from Polymer Foams: Science and Technology, Lee et al., "Introduction to Polymeric Foams", CRC Press (2007) 51 pages.
"Daploy(TM) HMS Polypropylene for Foam Extrusion", obtained from Borealis webpage obtained from the Internet Archive\s "Wayback Machine" as of Nov. 16, 2008 https://web.archive.org/web/20081116085125/http://www.borealisgroup.com/pdf/literature/borealisborouge/brochure/K_IN0020_GB_FF_2007_10_BB.pdf).
Excerpts from Gibson and Ashby, Cellular solids: Structure and properties—Second edition, Cambridge University Press, 1997, 66 pages.
Excerpts from Maier and Calafut, Polypropylene: the Definitive User's Guild and Databook, Plastics Design Library, William Andrew Inc. (1998), 35 pages.
ASTM D3763-86, an American Society for Testing of Materials (ASTM), "Standard Method for High-Speed Puncture Properties of Plastics Using Load and Displacement Sensors" (1986 Edition), 5 pages.
ASTM D1922-93, an American Society for Testing of Materials (ASTM), "Standard Method for Propagation Tear Resistance of Plastic Film and Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., "Applicability of the Transient Plane Source Method to Measure the Thermal Conductivity of Low-Density Polyethylene Foams", Journal of Polymer Science: Part B: Polymer Physics, vol. 42 (2004), 1226-1234.
The Burn Foundation, "Scald Burns", available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
"Power of a Microwave Oven", available at https://web.archive.org/web/20071010183358/http://hypertextbook.com/facts/2007/TatyanaNektalova.shtml, dated Oct. 10, 2007, accessed on Feb. 5, 2016.
Health Physics Society, "Microwave Oven Q & A", available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., "Heat Transfer in Polypropylene-Based Foams ProducedUsing Different Foaming Processes", Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of HIFAX CA 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr., 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry\s Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
Borealis Product Brochure, Daploy HMS Polypropylene for Foam Extrusion (2010), 20 pages.
R. Coquard and D. Baillis, Journal of Heat Transfer, 2006, 128(6): 538-549.
A. R. Katritzky et al., "Correlation and Prediction of the Refractive Indices of Polymers by QSPR," J. Chem. Inf. Comput. Sci., 38 (1998), 1171-1176.
M. Antunes et.al., "Heat Transfer in Polyolefin Foams," Heat Transfer in Multi-Phase Materials, A. Öchsner and G. E. Murch, Eds. Springer-Verlag Berlin Heidelberg, 2011, 131-161.
Inter Partes Review Petition for U.S. Pat. No. 8,883,280 (2101 pages) [Submitted in multiple parts—section 1].
Inter Partes Review Petition for U.S. Pat. No. 8,883,280 (2101 pages) [Submitted in multiple parts—section 2].
Inter Partes Review Petition for U.S. Pat. No. 8,883,280 (2101 pages) [Submitted in multiple parts—section 3].
Inter Partes Review Petition for U.S. Pat. No. 8,883,280 (2101 pages) [Submitted in multiple parts—section 4].
English summary of Mexican Office Action for Application Serial No. MX/a/2013/014993, Apr. 27, 2016, 5 pages.
Japanese Office Action for Japanese Patent Application No. 2014-528384, dated Mar. 1, 2016.
International Preliminary Report on Patentability dated Feb. 16, 2016, relating to International Application No. PCT/US2014/051508.
English Summary of Chinese Office Action for Application Serial No. 201380041896.1, dated Mar. 18, 2016, 7 pages.
Extended European Search Report for European Application No. 13827981.5-1708 / 2888092 PCT/US2013/053935, dated Feb. 19, 2016.
Australian First Patent Examination Report for Application No. 2012271047, dated Feb. 29, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).

(56) References Cited

OTHER PUBLICATIONS

Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
Australian Second Patent Examination Report for Application No. 2012302251, dated Feb. 26, 2016.
Doerpinghaus et al., "Separating the effects of sparse long-chain branching on rheology from those due to molecular weight in polyethylenes", Journal of Rheology, 47, 717 (2003).
English Summary of Chinese Office Action for Application Serial No. 201280051426.9, Apr. 29, 2016, 5 pages.
Third Party Submission Under 37 CFR 1.290 filed on May 12, 2016 in U.S. Appl. No. 14/739,510.
Daploy HMS Polypropylene for Foam Extrusion, 20 pp., BOREALIS Borouge Shaping the Future with Plastics, Published 2010, www.borealisgroup.com, www.borouge.com, Vienna, Austria.
Lugao, A.B. et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).
Extended European Search Report for European Application No. 13863308.6, 8 pages.
Office Action dated Aug. 11, 2016 for U.S. Appl. No. 14/108,110.
Chinese Office Action mailed Aug. 3, 2016 for Chinese Patent Application 201480007369.3, 13 pages.
Office Action dated Mar. 6, 2017 for U.S. Appl. No. 14/108,142.
Chinese Office Action for Chinese App. No. 201480052411.3 mailed Feb. 28, 2017, 16 pages.
New Zealand First Examination Report for New Zealand Application 708546, 2 pages.
Singapore Office Action and Written Opinion dated Dec. 13, 2016 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action mailed Mar. 10, 2017 for Chinese Patent Application 201480007369.3, 11 pages.
New Zealand Examination Report for New Zealanc Application No. 708463, 3 pages.
Office Action dated Mar. 24, 2017 for U.S. Appl. No. 14/506,906.
Supplemental European Search Report for European App. No. 14836418 mailed Feb. 23, 2017, 6 pages.
Office Action dated Apr. 7, 2017 for U.S. Appl. No. 14/063,252.
Chinese Office Action for Chinese Application No. 201380065127.5 dated Apr. 1, 2017, 14 pages.
Japanese Office Action for Japanese Application No. 2014-515882, dated Apr. 4, 2017, 6 pages.
New Zealand Examination Report for New Zealand Application No. 708552, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 dated Apr. 5, 2017, 12 pages.
Chinese Office Action for Chinese App. No. 201380065089.3 dated Apr. 21, 2017, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Jun. 7, 2017 for U.S. Appl. No. 15/388,319; (pp. 1-21).
Chinese Office Action for Chinese Application No. 201280051426.9 dated May 15, 2017, 12 pages.
Chinese Office Action for Chinese App. No. 201380041896.1 dated May 22, 2017, 9 pages.
Australian Examiner's Report for Australian App. No. 2014244210 received Jun. 16, 2017, 4 pages.
European Examination Report for European App. No. 13863308.6 dated May 17, 2017, 3 pages.
Extended European Search Report for European App. No. 14836418.5 dated Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 dated Jun. 6, 2017, 19 pages.
New Zealand Examination Report for New Zealand Application 708546 dated Jul. 11, 2017, 2 pages.
Office Action dated Jul. 19, 2017 for U.S. Appl. No. 15/004,263; (pp. 1-17).
European Examination Report for European App. No. 13849152.7 dated Jun. 29, 2017, 4 pages.

\* cited by examiner

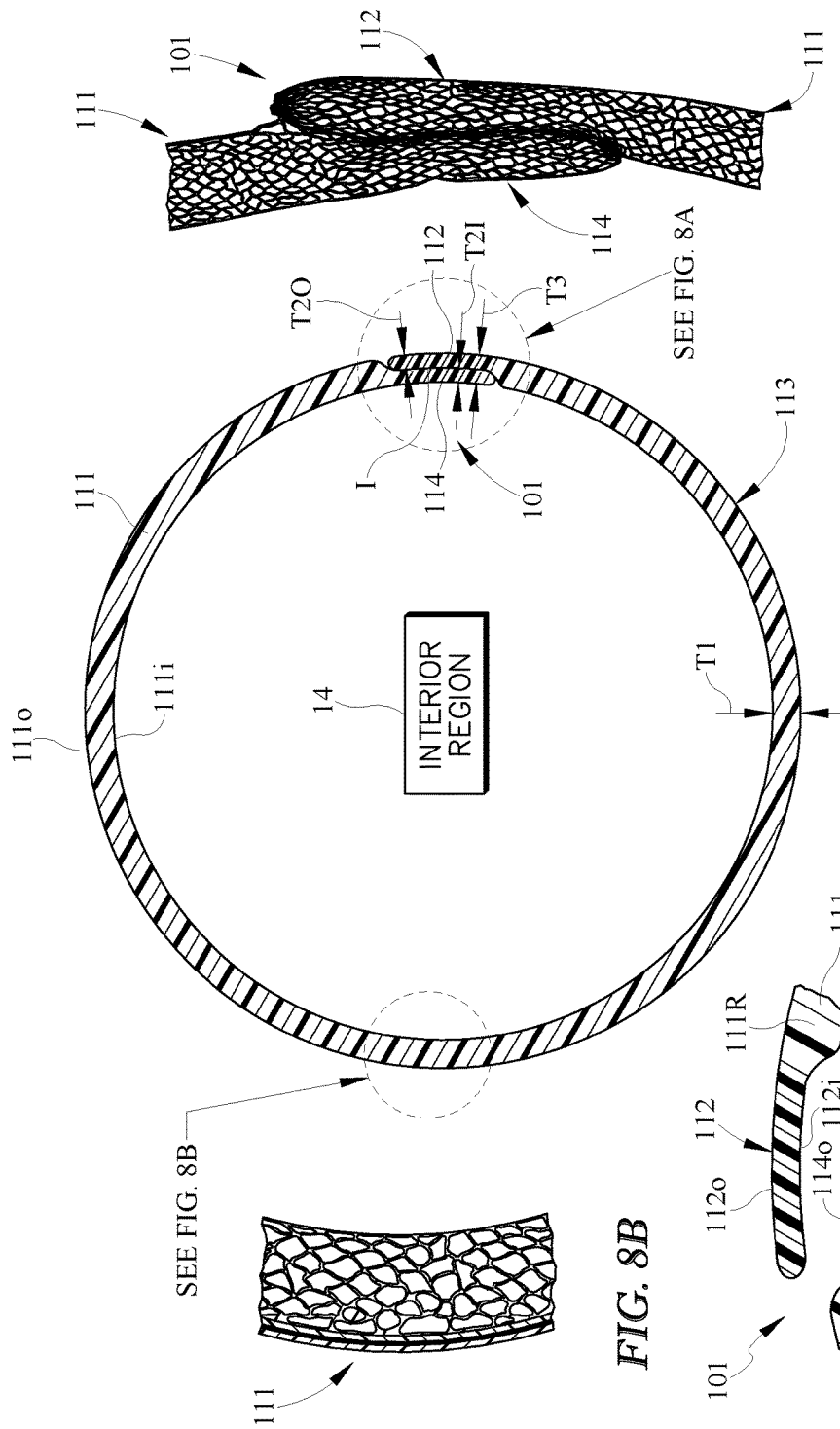

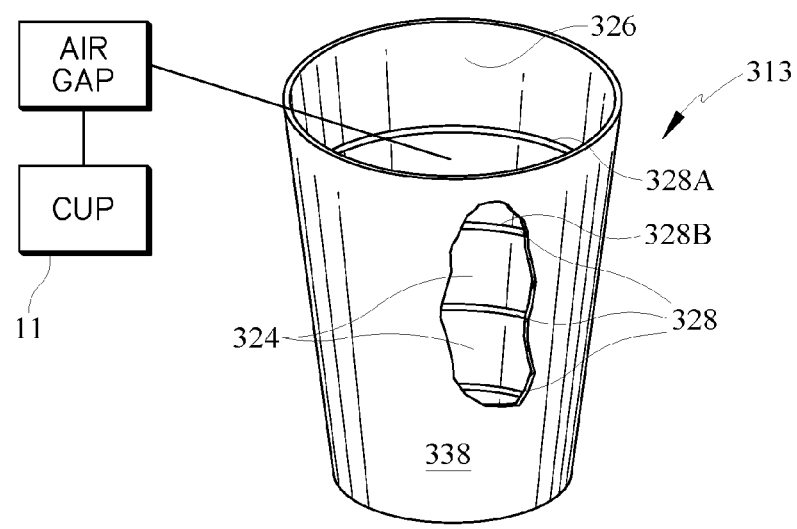
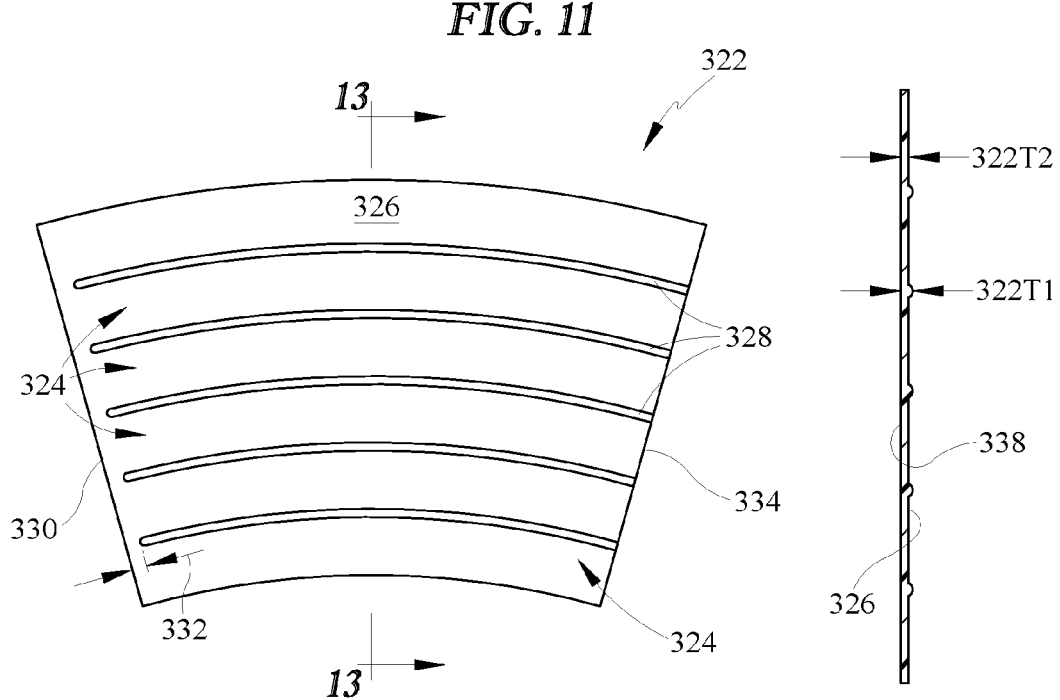
FIG. 11
FIG. 12              FIG. 13

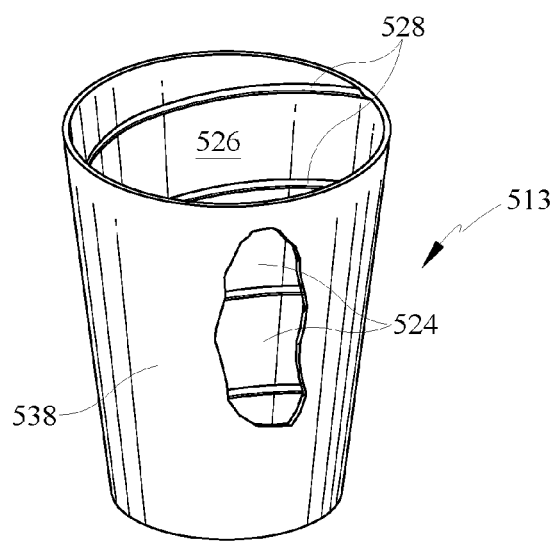
FIG. 17
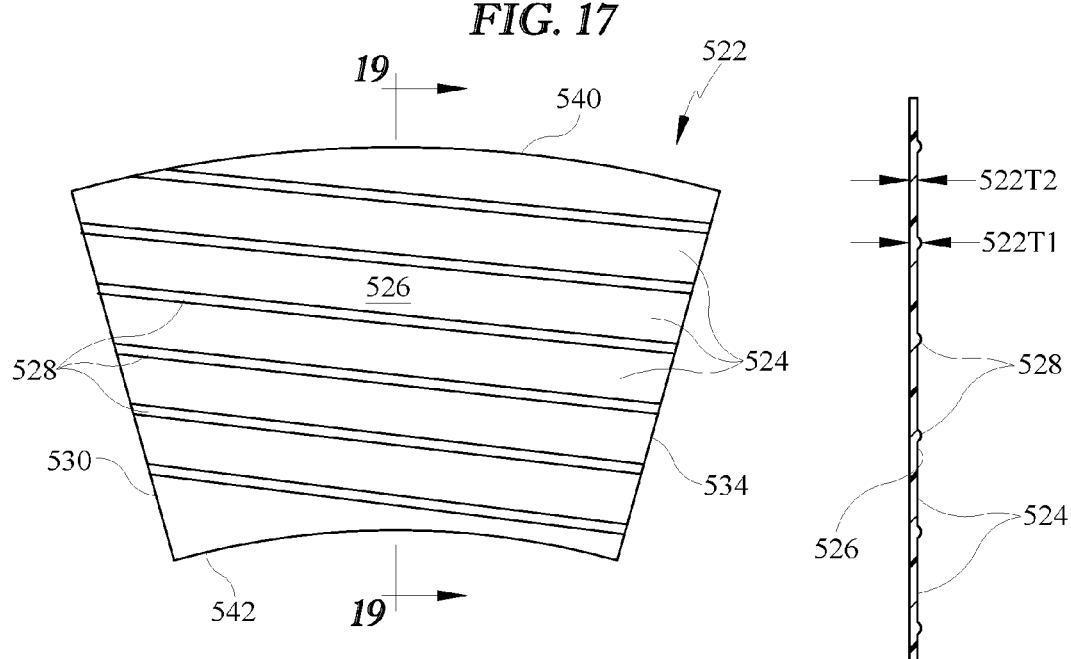 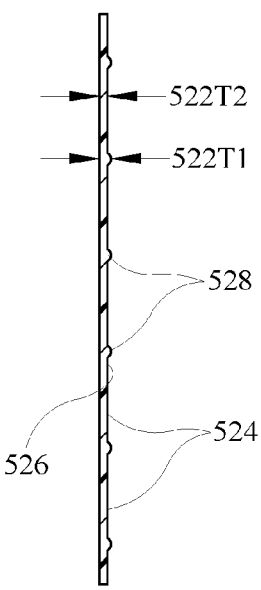
FIG. 18
FIG. 19

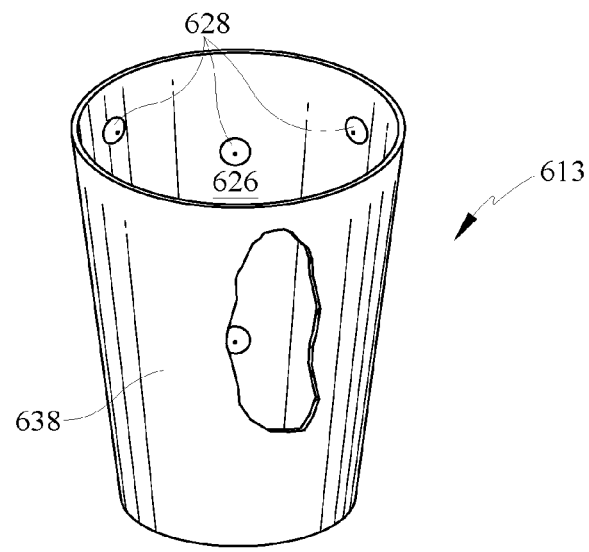
*FIG. 20*
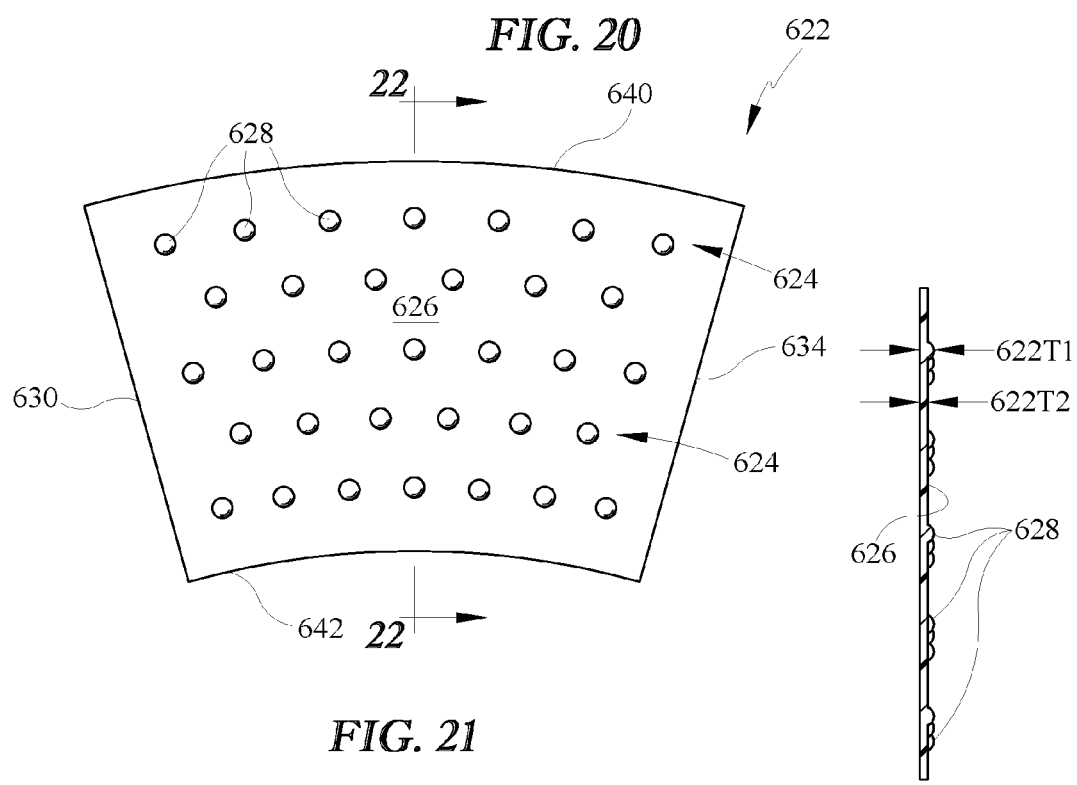
*FIG. 21*
*FIG. 22*

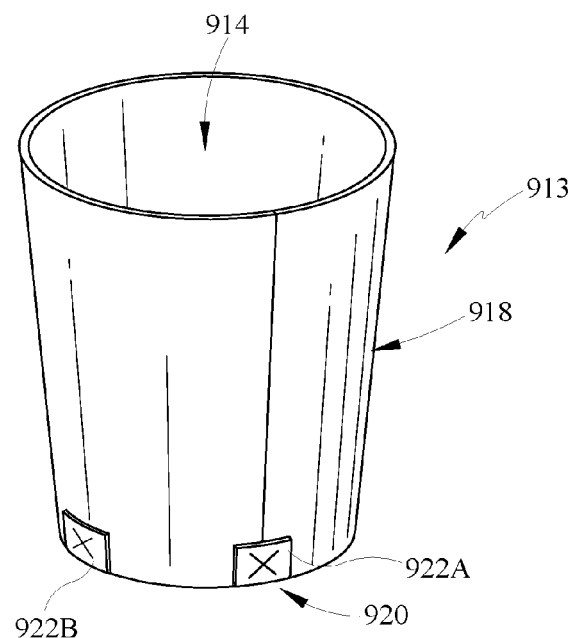
FIG. 29
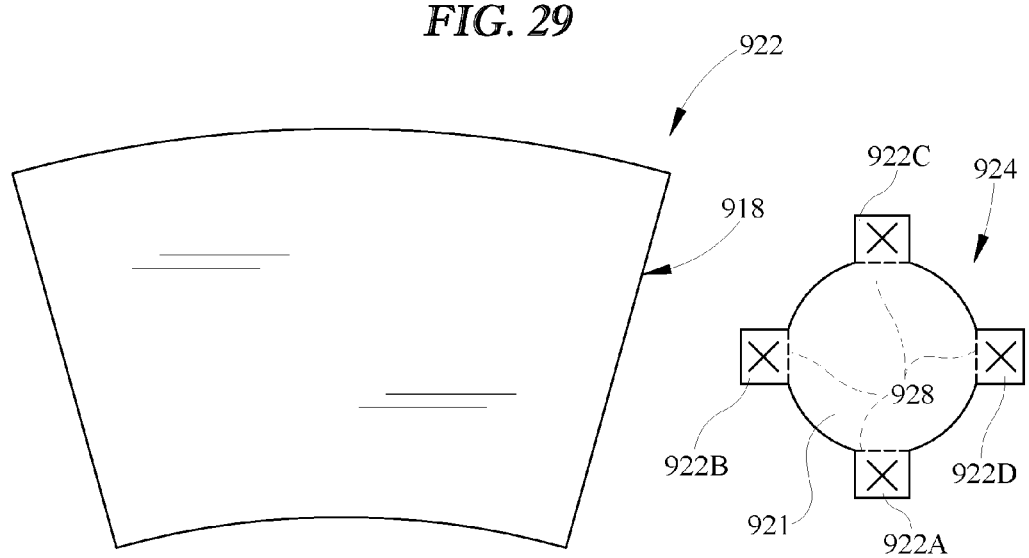
FIG. 30
FIG. 31

INSULATIVE CONTAINER

PRIORITY CLAIM

This application is a continuation of U.S. application Ser. No. 14/755,546, filed Jun. 30, 2015, now U.S. Pat. No. 9,346,605, which is a continuation of U.S. application Ser. No. 13/526,417, filed Jun. 18, 2012, now U.S. Pat. No. 9,102,461, which claims priority under 35 U.S.C. §119(e) to U.S. Provisional Application Ser. No. 61/498,415, filed Jun. 17, 2011 and Ser. No. 61/618,637, filed Mar. 30, 2012, each of which are expressly incorporated by reference herein.

BACKGROUND

The present disclosure relates to containers, such as cups, and particularly to thermoformed containers. More particularly, the present disclosure relates to insulated sleeves for cups.

SUMMARY

A vessel in accordance with the present disclosure is configured to hold a product in an interior region formed in the container. In illustrative embodiments, the container is a cup.

In illustrative embodiments, an insulative container includes a cup and an insulative sleeve. The insulative sleeve is coupled to an exterior surface of the cup to insulate a consumer holding the cup from hot or cold temperatures associated with materials or beverages stored in the cup.

In illustrative embodiments, the insulative sleeve is made of a sheet comprising an insulative cellular non-aromatic polymeric material. In some embodiments of the present disclosure, the sheet includes a strip of insulative cellular non-aromatic polymeric material and a skin coupled to the strip and configured to display artwork and text. In other embodiments of the present disclosure, such text and artwork are printed directly on an exterior surface of the strip of insulative cellular non-aromatic polymeric material. In illustrative embodiments, the floor also comprises insulative cellular non-aromatic polymeric material.

In illustrative embodiments, the insulative sleeve is arranged to surround and embrace an exterior surface of a hot-beverage drink cup to provide a grippable low-temperature thermal barrier that can be gripped by a consumer. The sleeve comprises a sheet comprising insulative cellular non-aromatic polymeric material configured to provide means for enabling localized plastic deformation in the sheet to provide a plastically deformed first material segment having a first density located in a first portion of the sheet and a second material segment having a second density lower than the first density located in an adjacent second portion of the sheet without fracturing the insulative cellular non-aromatic polymeric material so that a predetermined insulative characteristic is maintained in the sheet.

The insulative cellular non-aromatic polymeric material included in the insulative sleeve is configured in accordance with the present disclosure to provide means for enabling localized plastic deformation in the insulative sleeve to provide (1) a plastically deformed first material segment having a first density in a first portion of the insulative sleeve and (2) a second material segment having a relatively lower second density in an adjacent second portion of the insulative sleeve. In illustrative embodiments, the more dense first material segment is thinner than the second material segment.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 1:
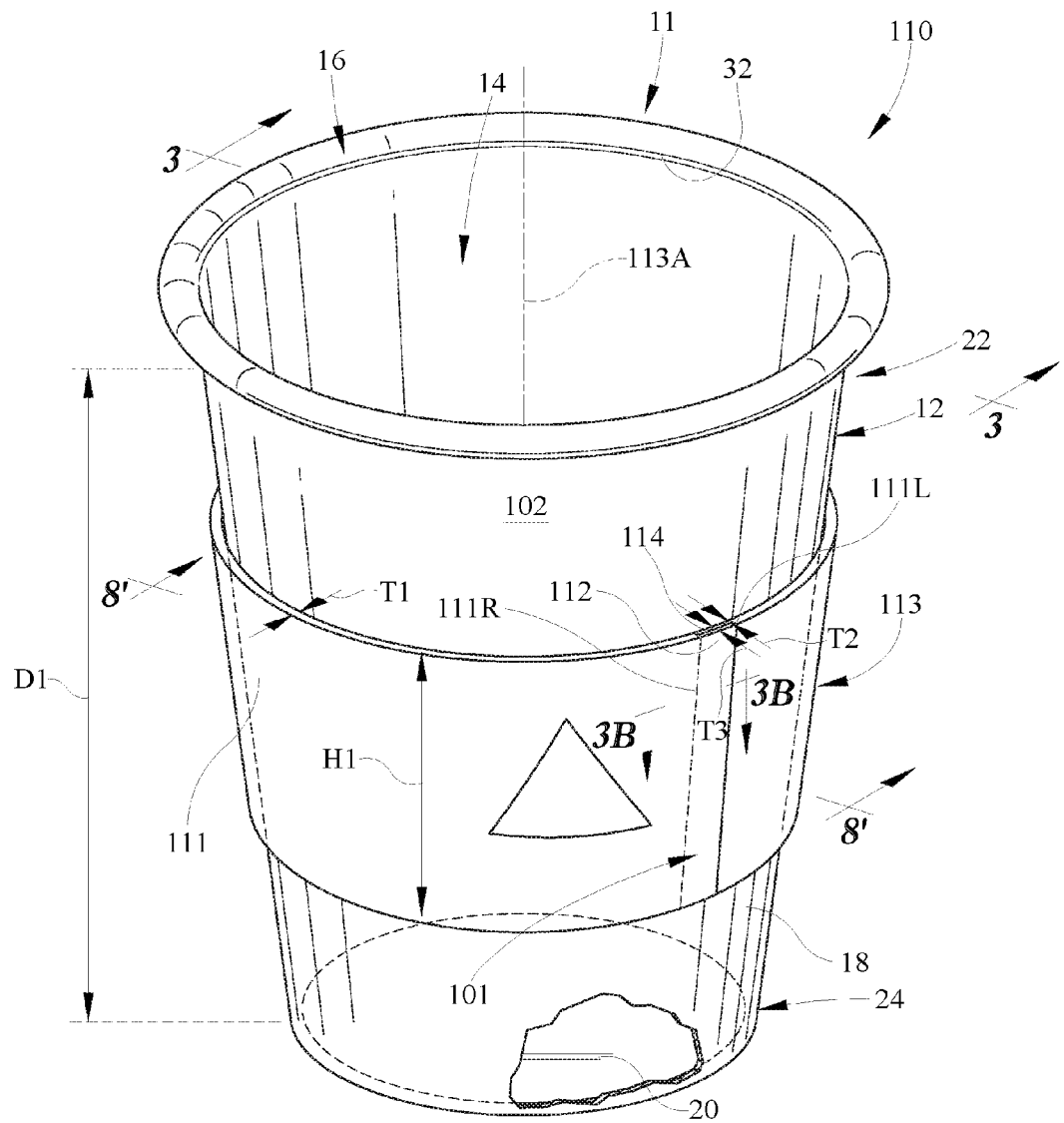
FIG. 1 is a perspective view of a first embodiment of an insulative container in accordance with the present disclosure showing that the insulative container includes a cup including a rolled brim and a base including a sleeve-shaped side wall and a floor and an insulative sleeve coupled to exterior surface of the side wall to extend around the side wall of the cup.
Figures 3, 3A:
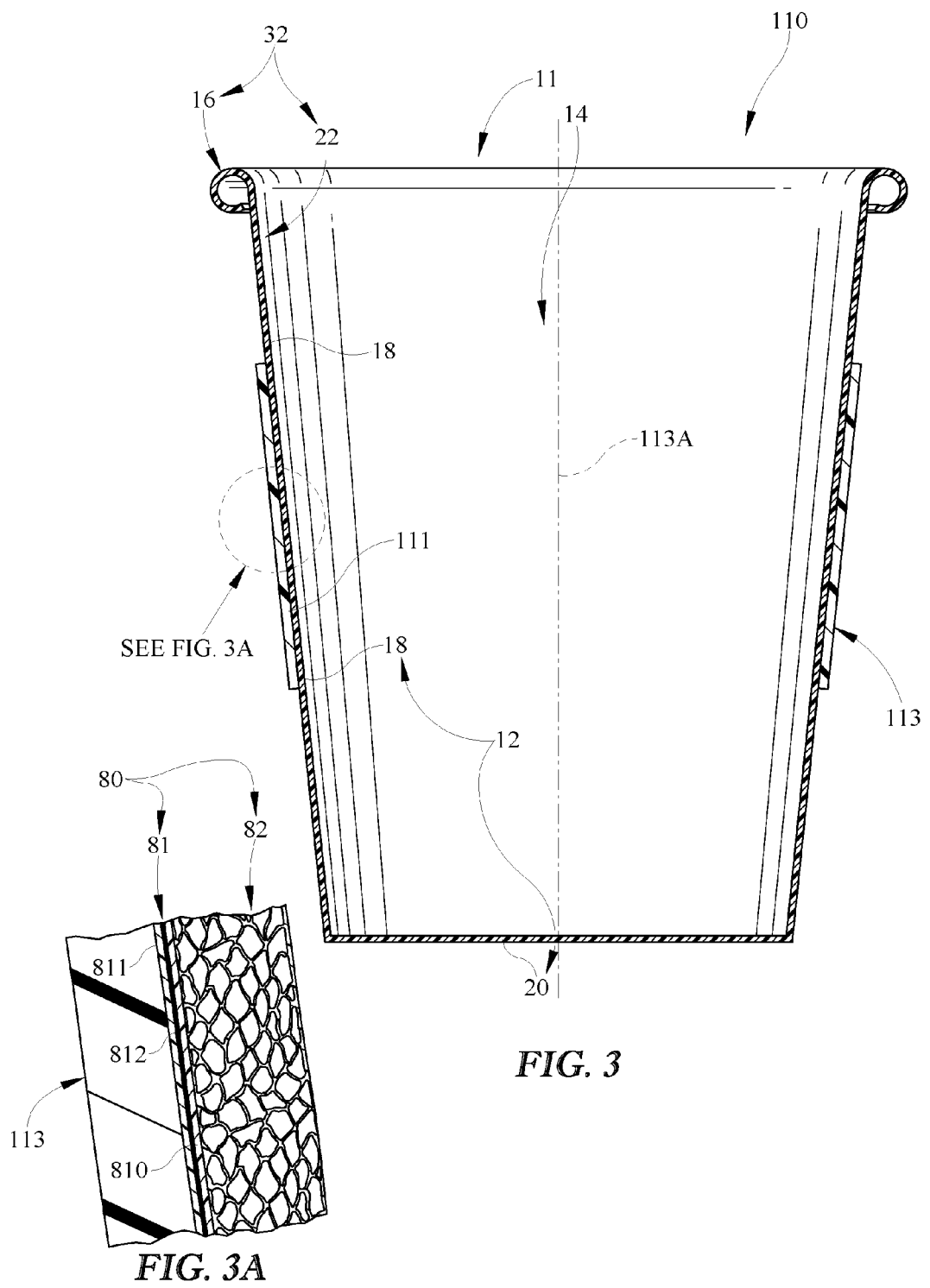
FIG. 3 is a sectional view taken along line 3-3 of FIG. 1 showing that the insulative sleeve is coupled to the side wall included in the base of the cup and positioned to lie between and in spaced-apart relation from each of the rolled brim and the floor.
FIG. 3A is an enlarged sectional view of a portion of the side wall included in the body of the insulative cup of FIG. 3 and a portion of the insulative sleeve and showing that the side wall is made from a sheet that includes, from left to right, a skin including a film, an ink layer, and an adhesive layer, and a strip of insulative cellular non-aromatic polymer material.
Figure 3B:
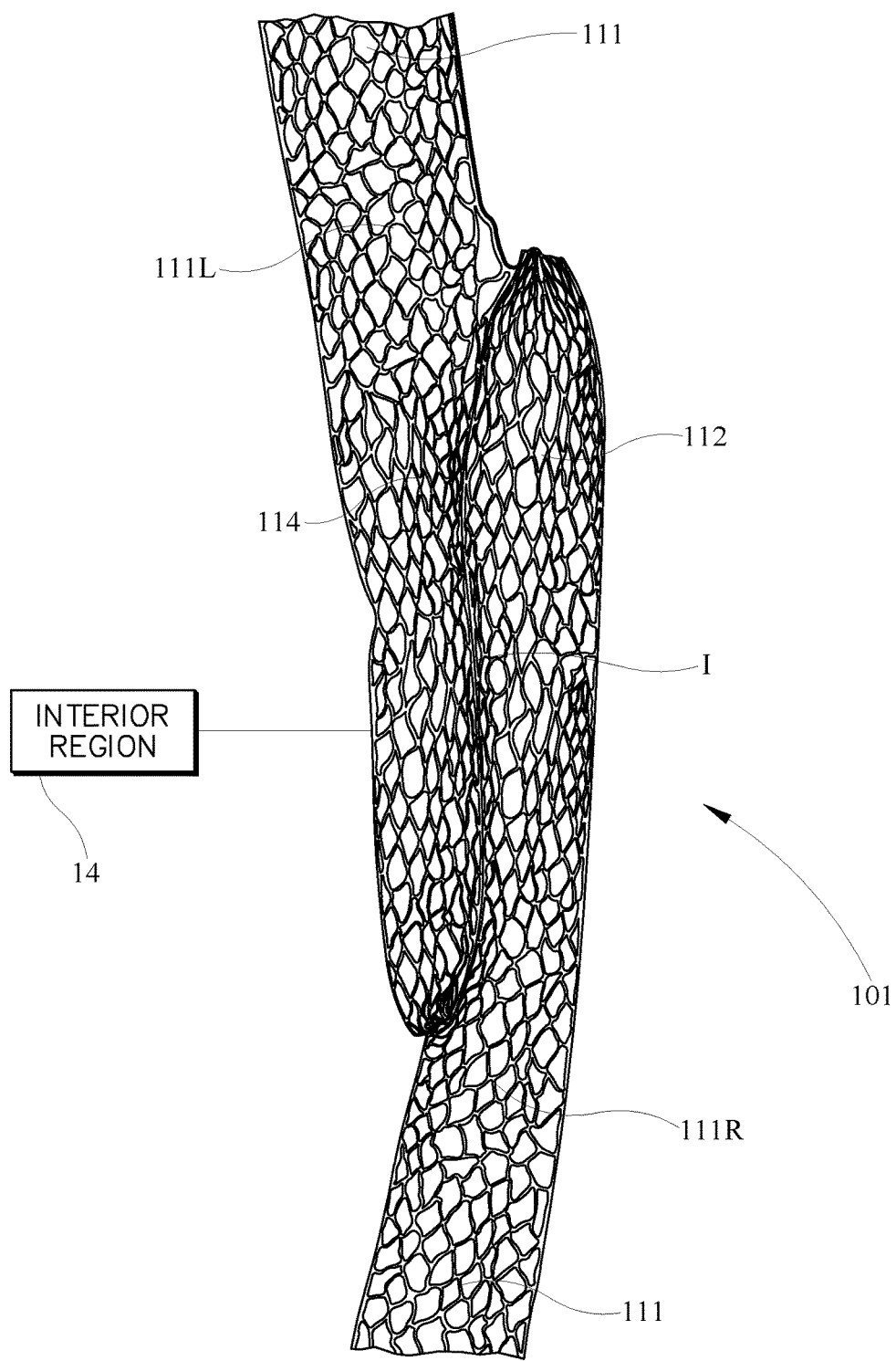
Figure 4:
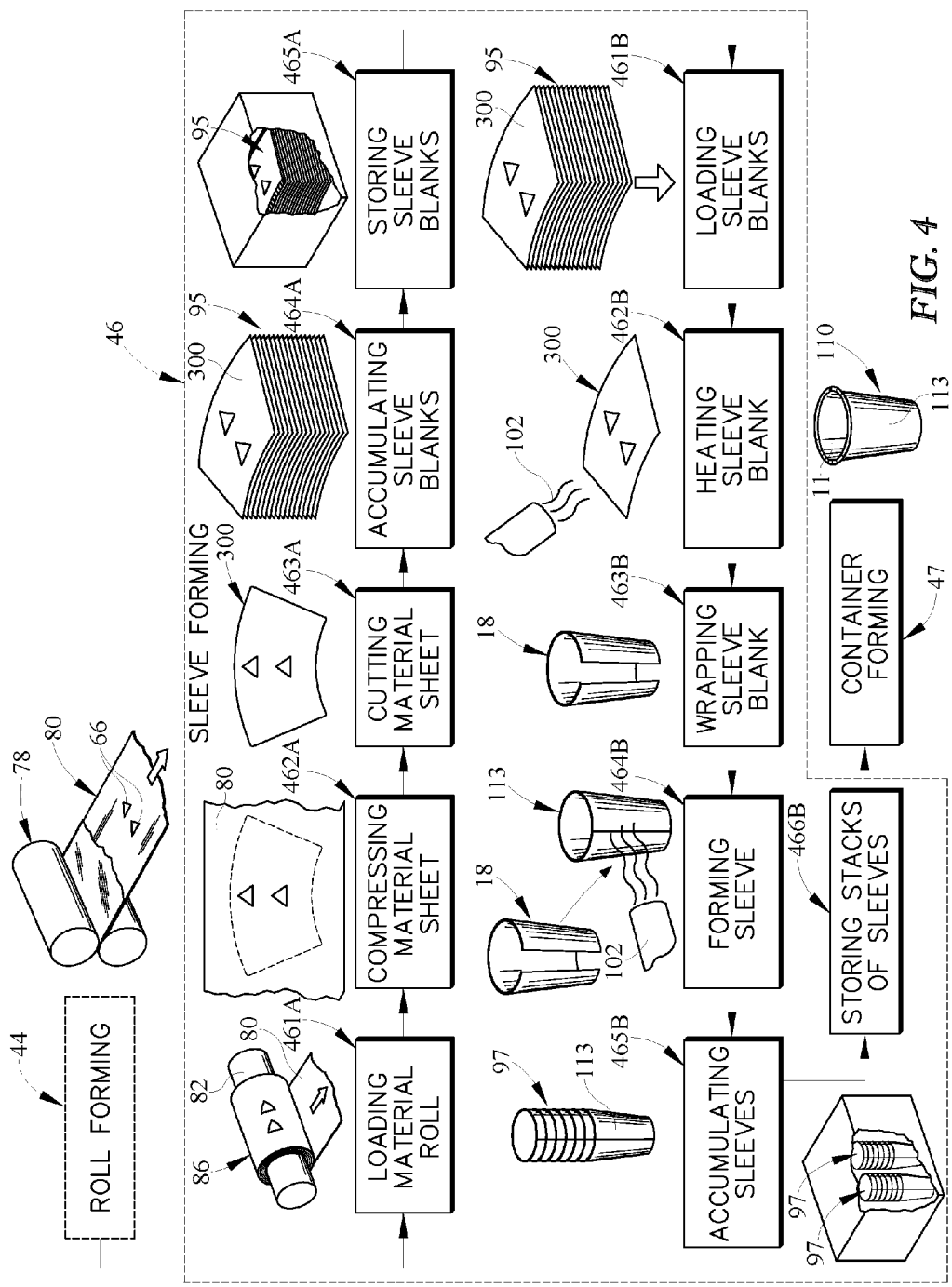
Figure 5:
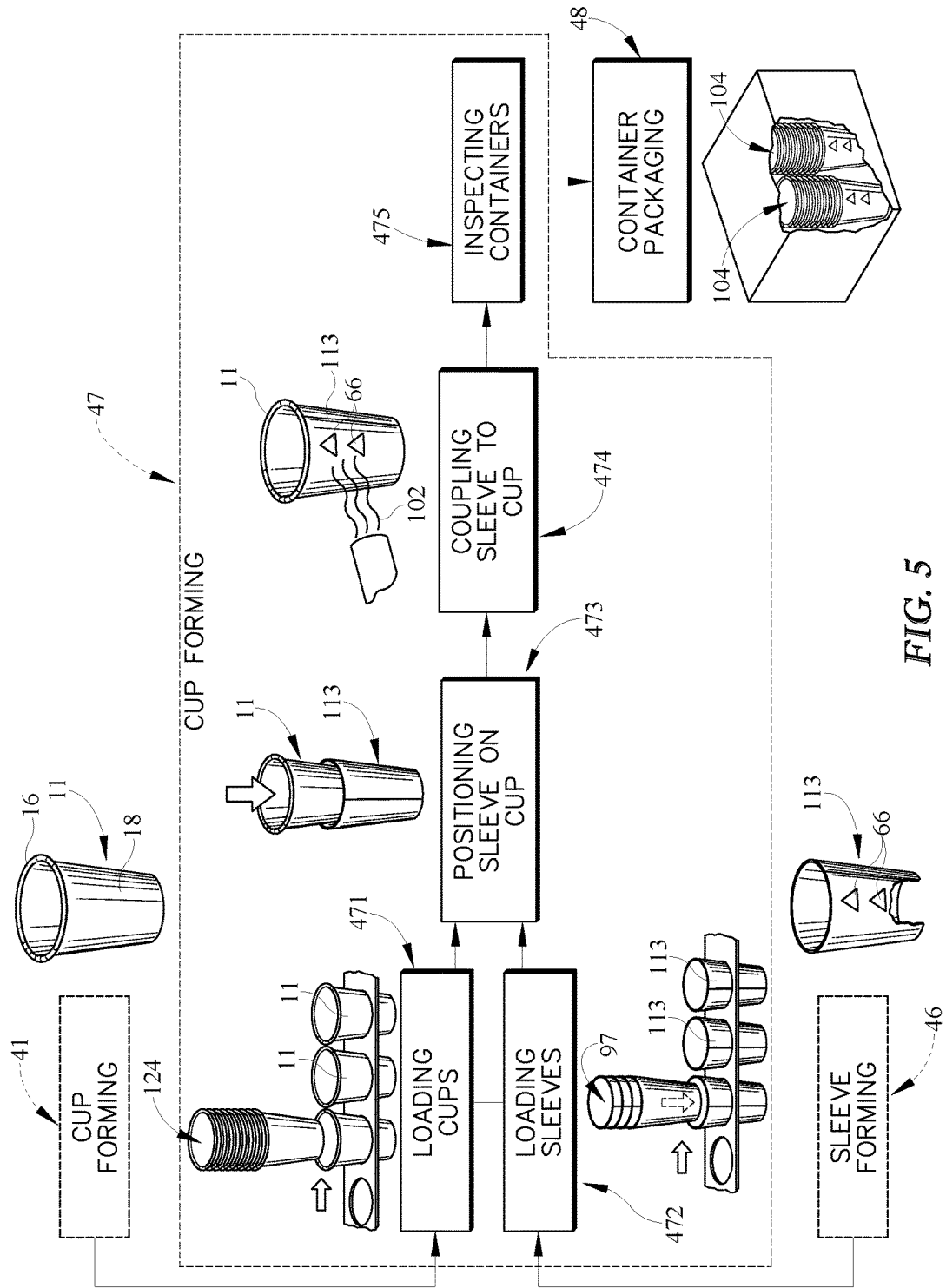
Figure 6:
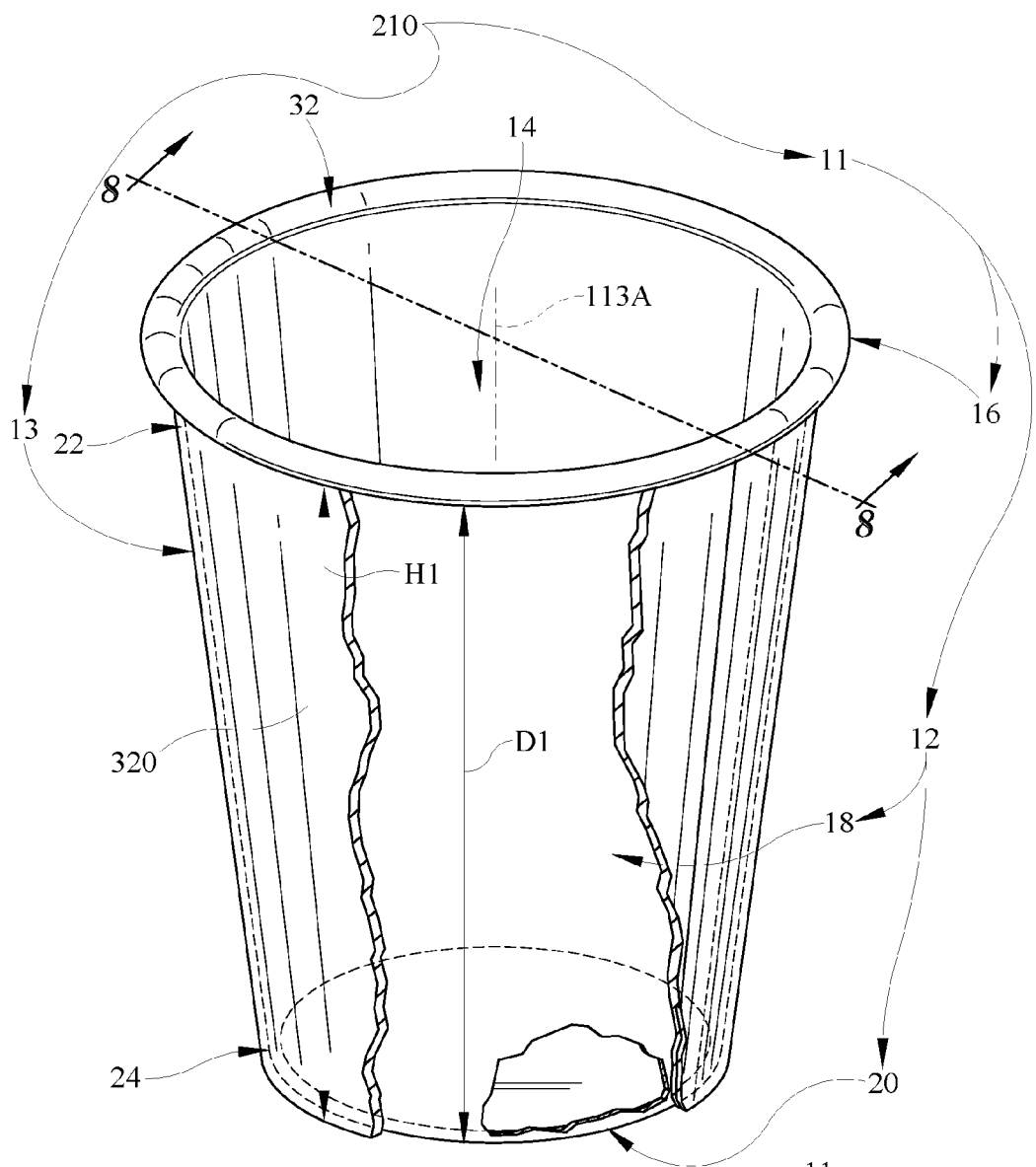
Figure 7:
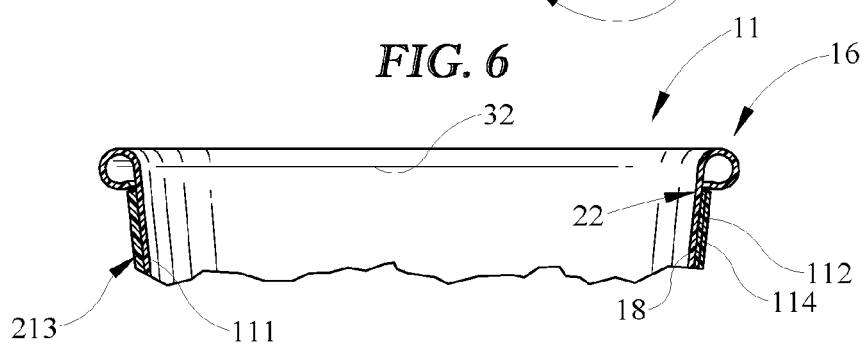
Figure 8:
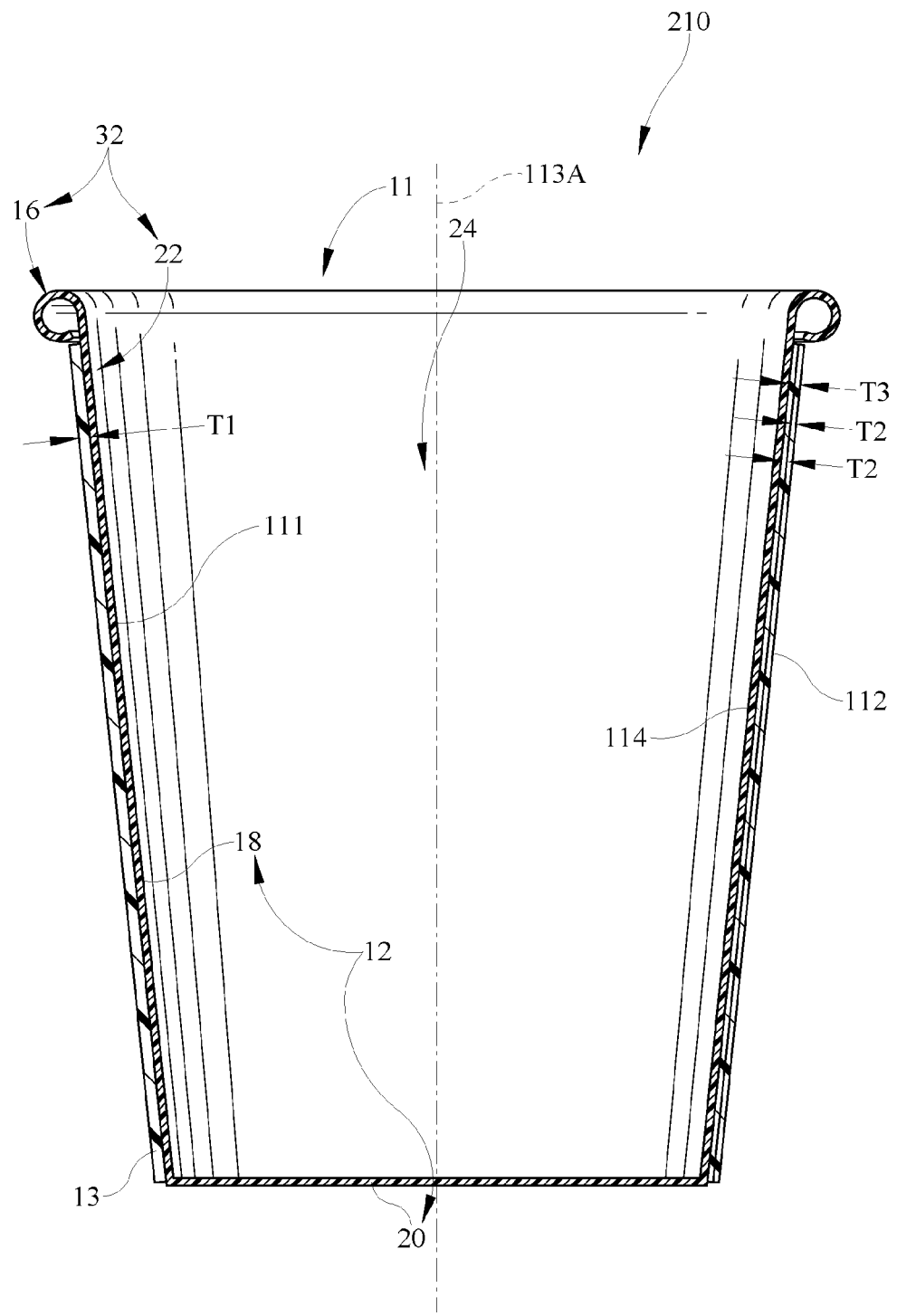
Figure 9:
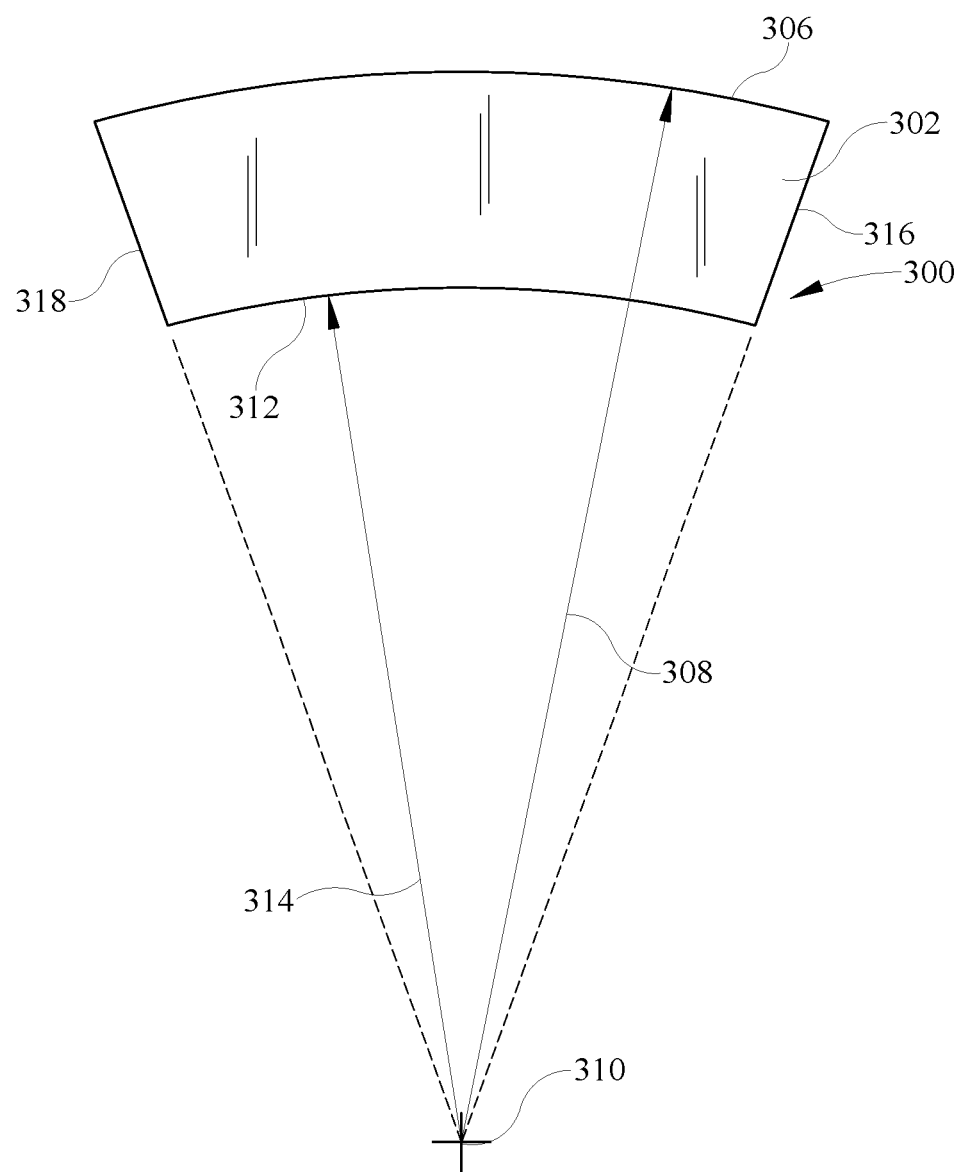
Figure 10:
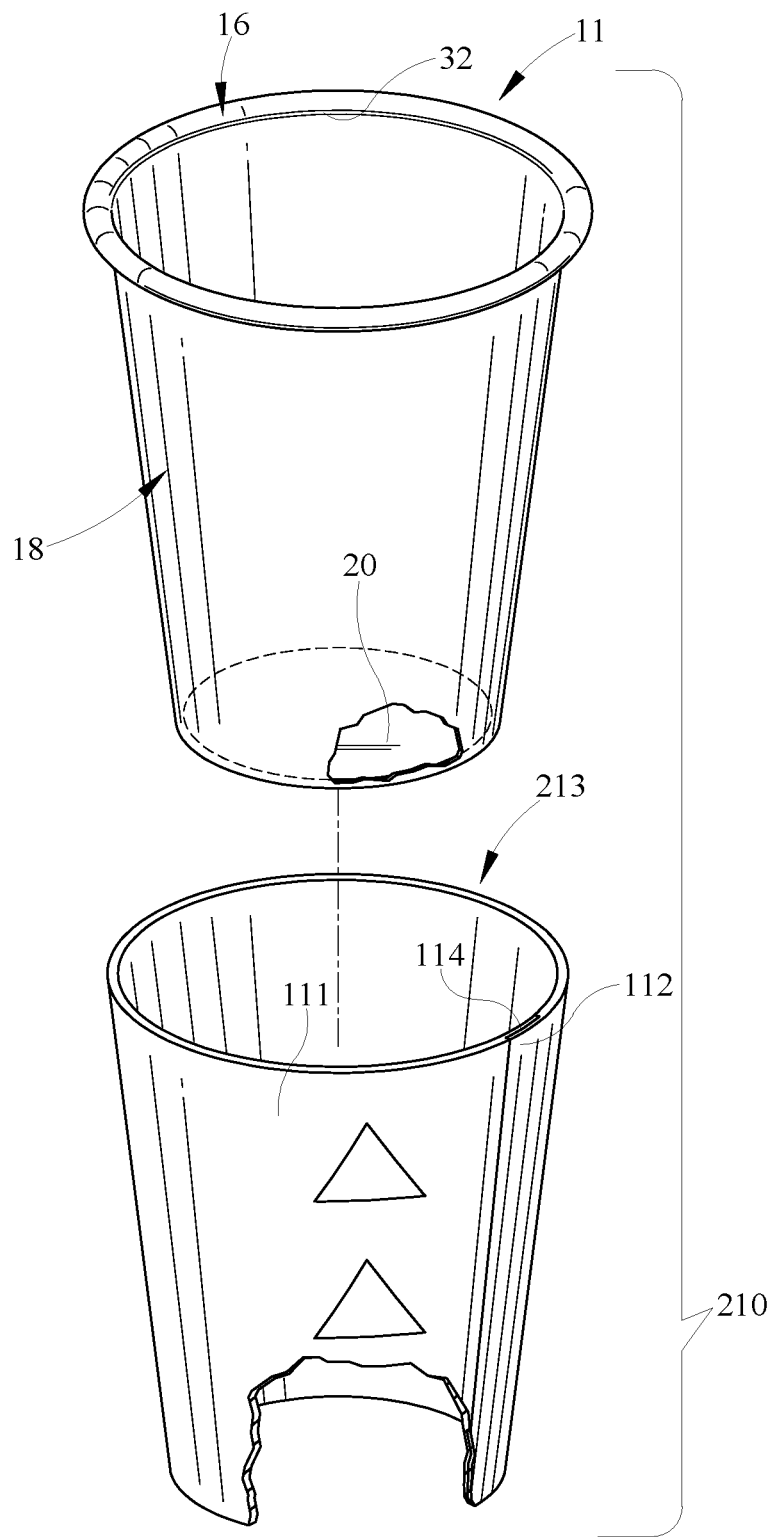
Figure 14:
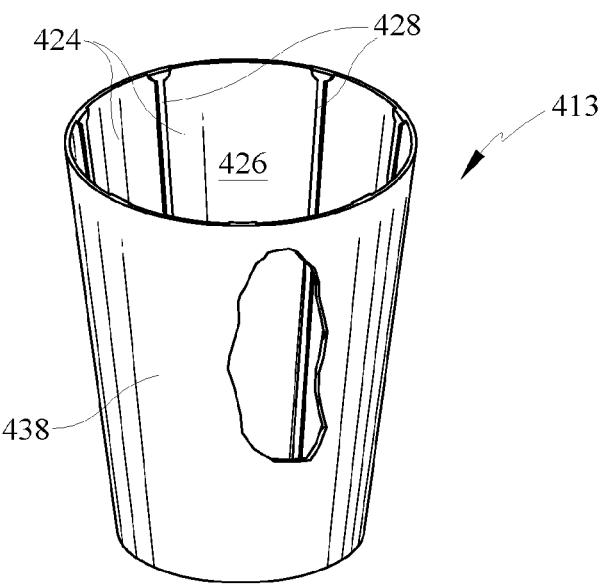
Figure 15:
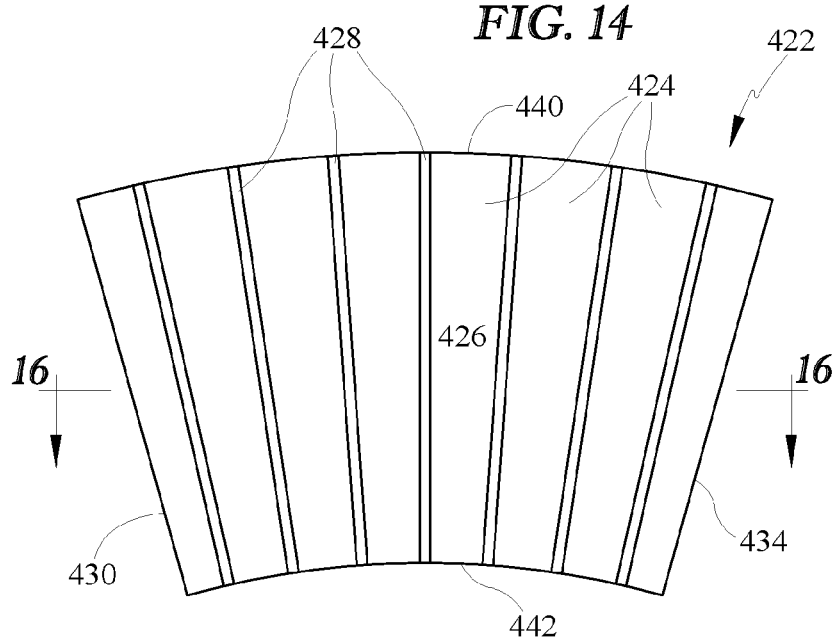
Figure 16:
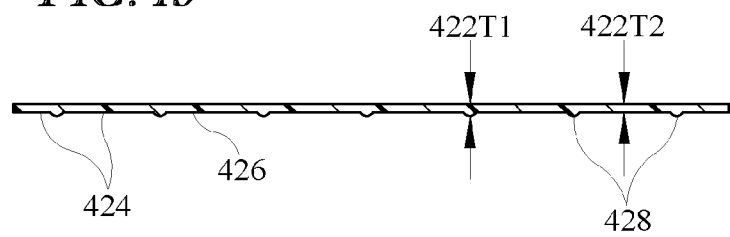
Figure 23:
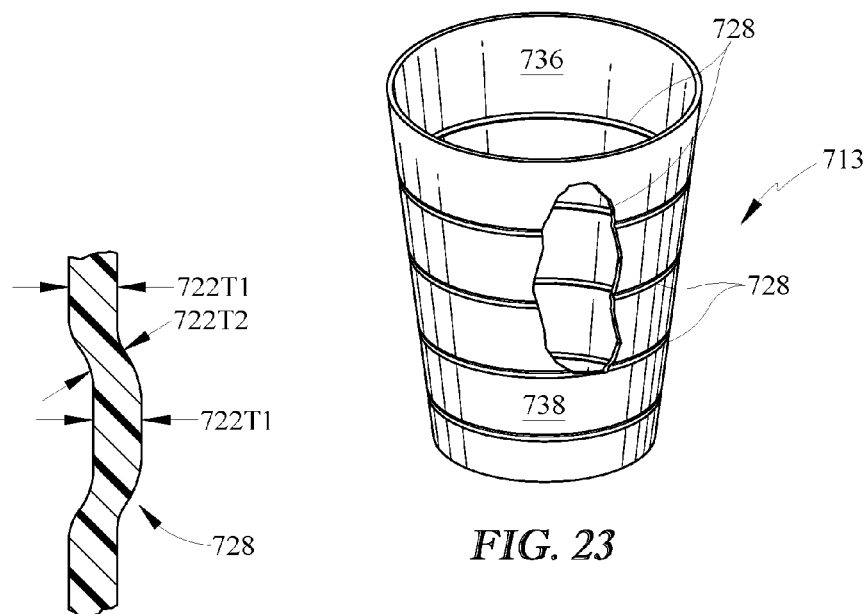
Figure 26:
Figure 24:
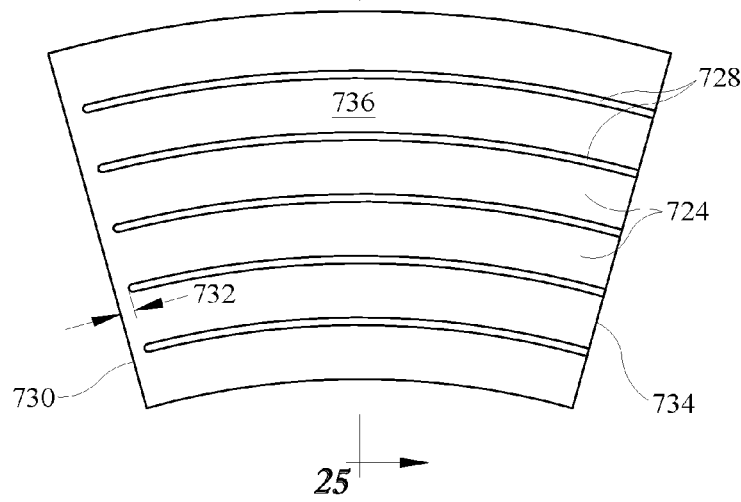
Figure 25:
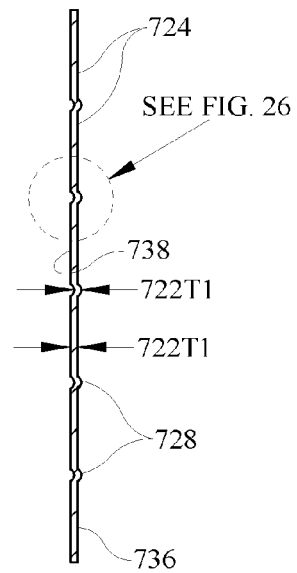
Figure 27:
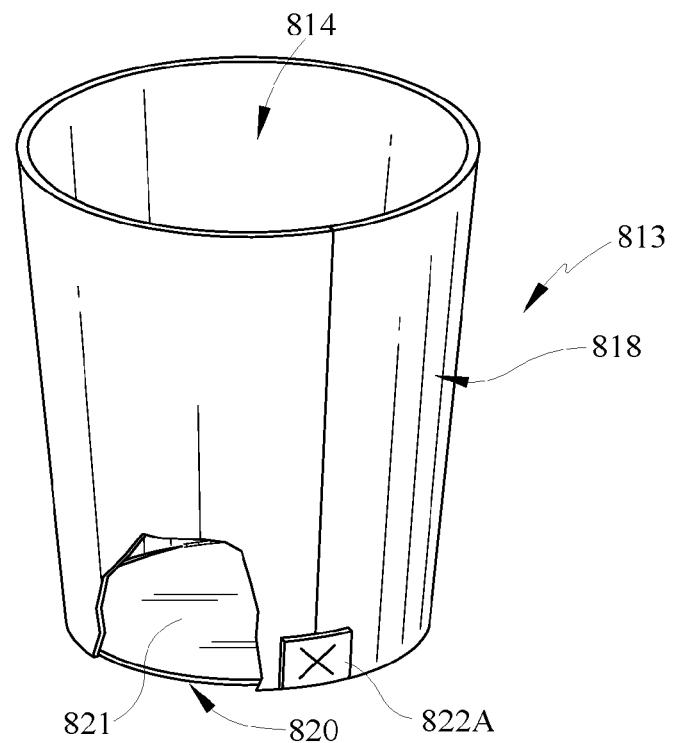
Figure 28:
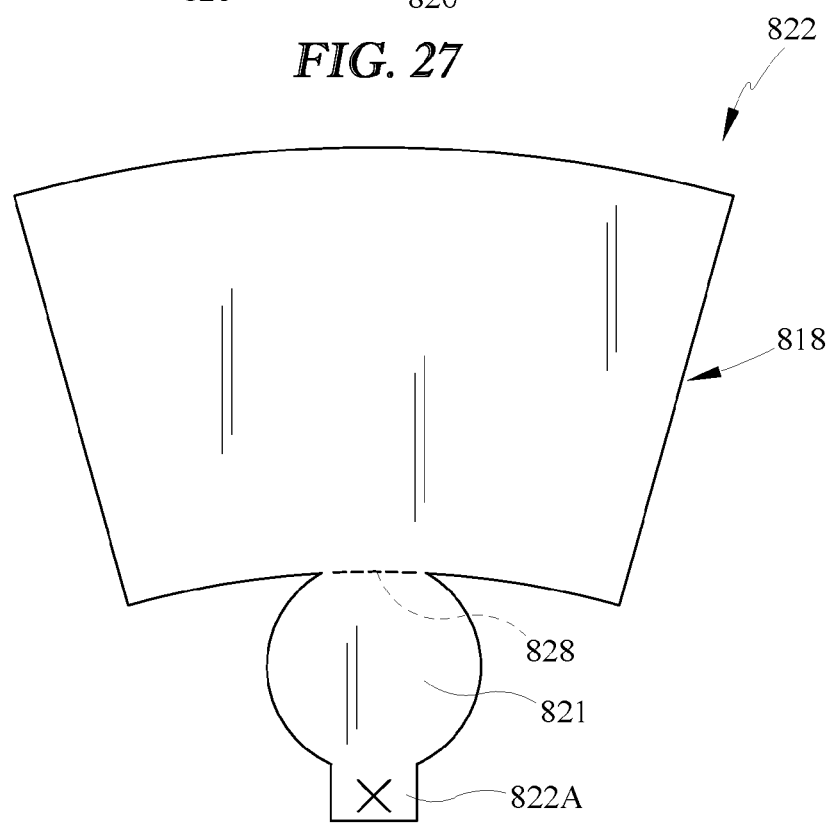
Figure 32:
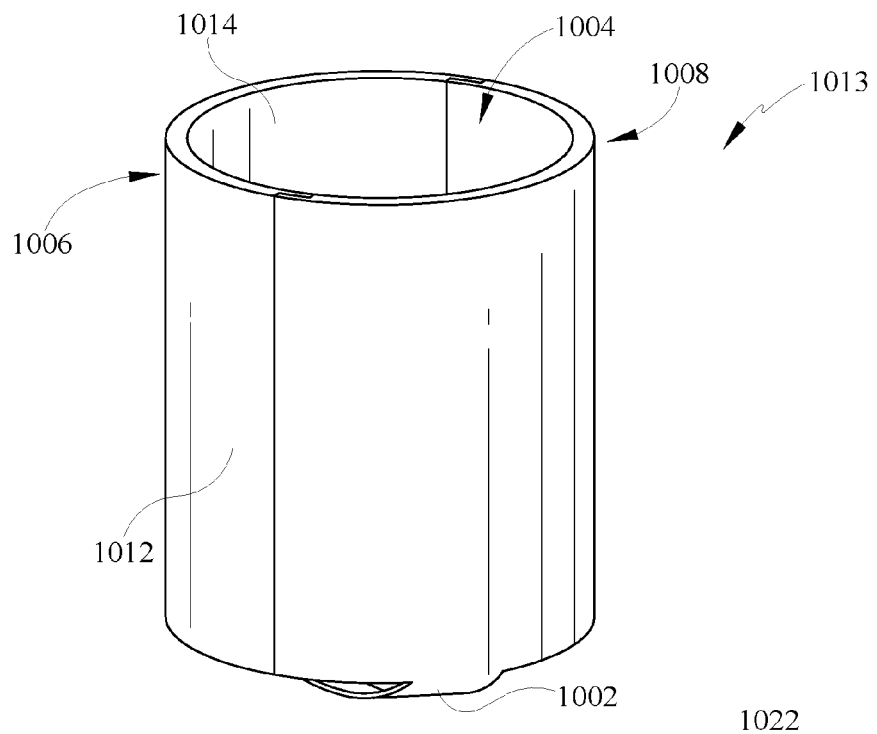
Figure 33:
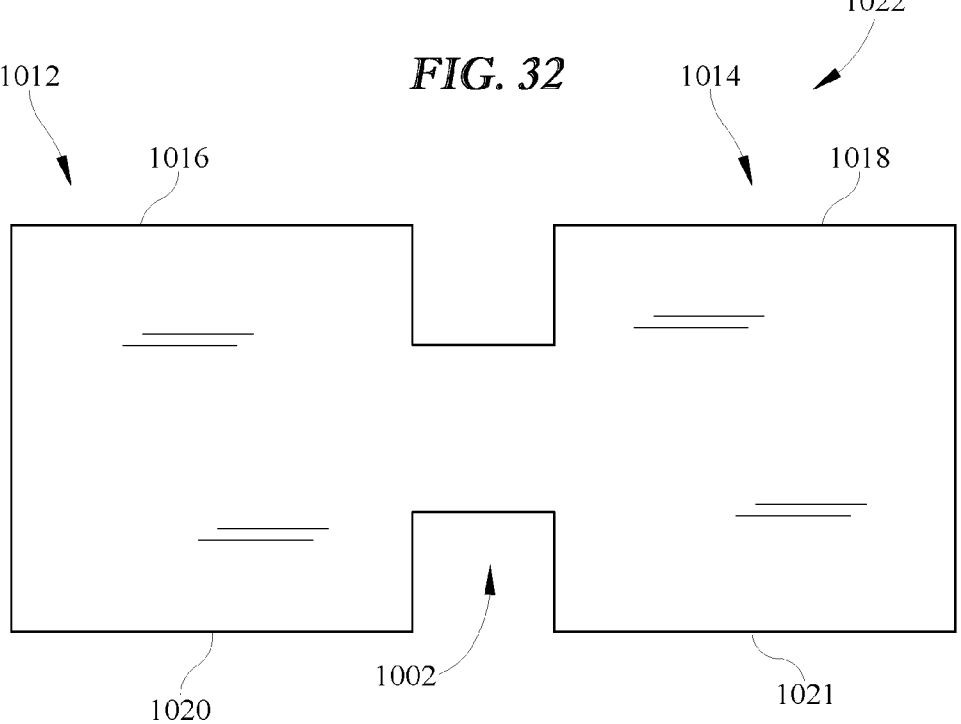
Figure 34:
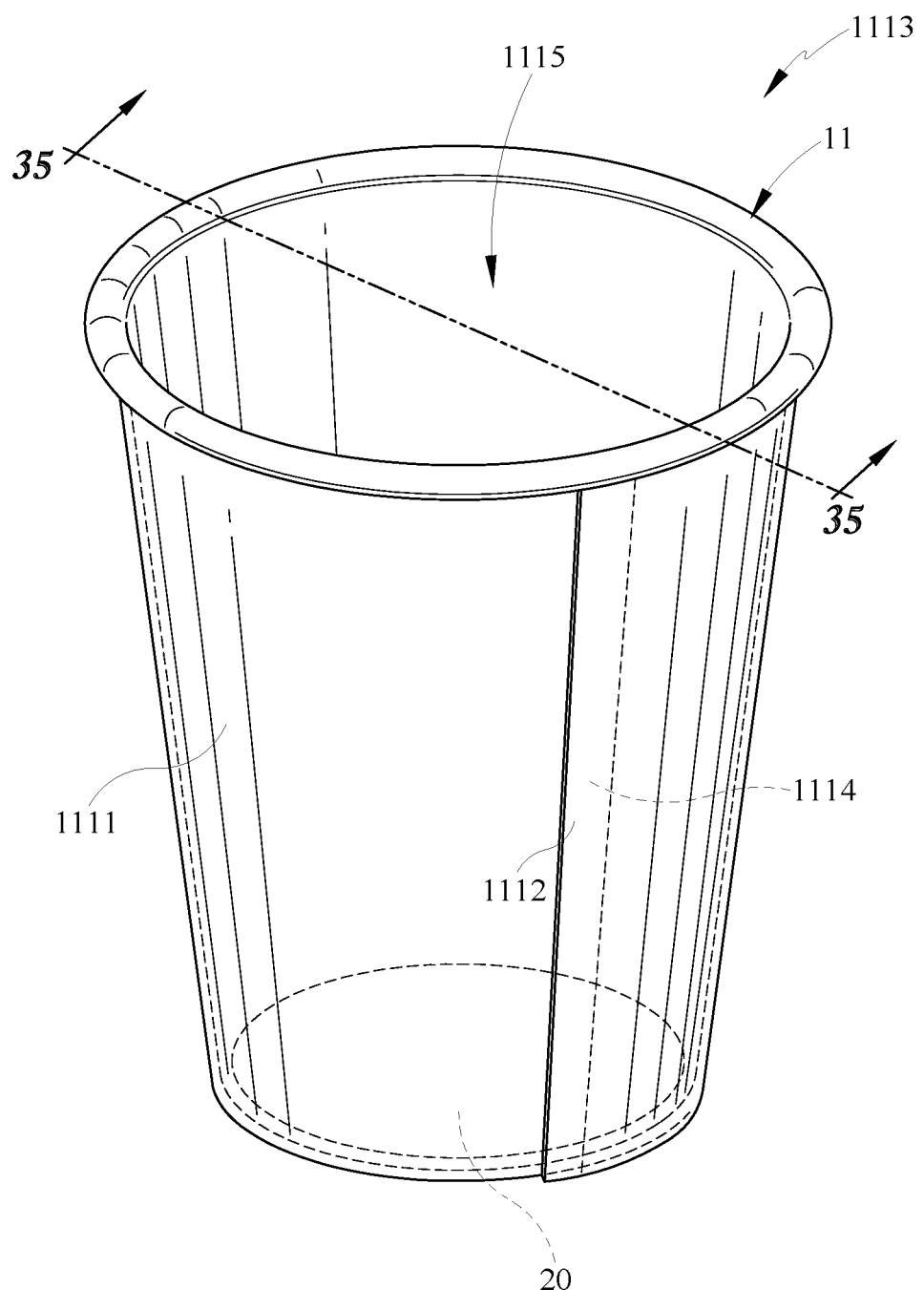
Figure 35:
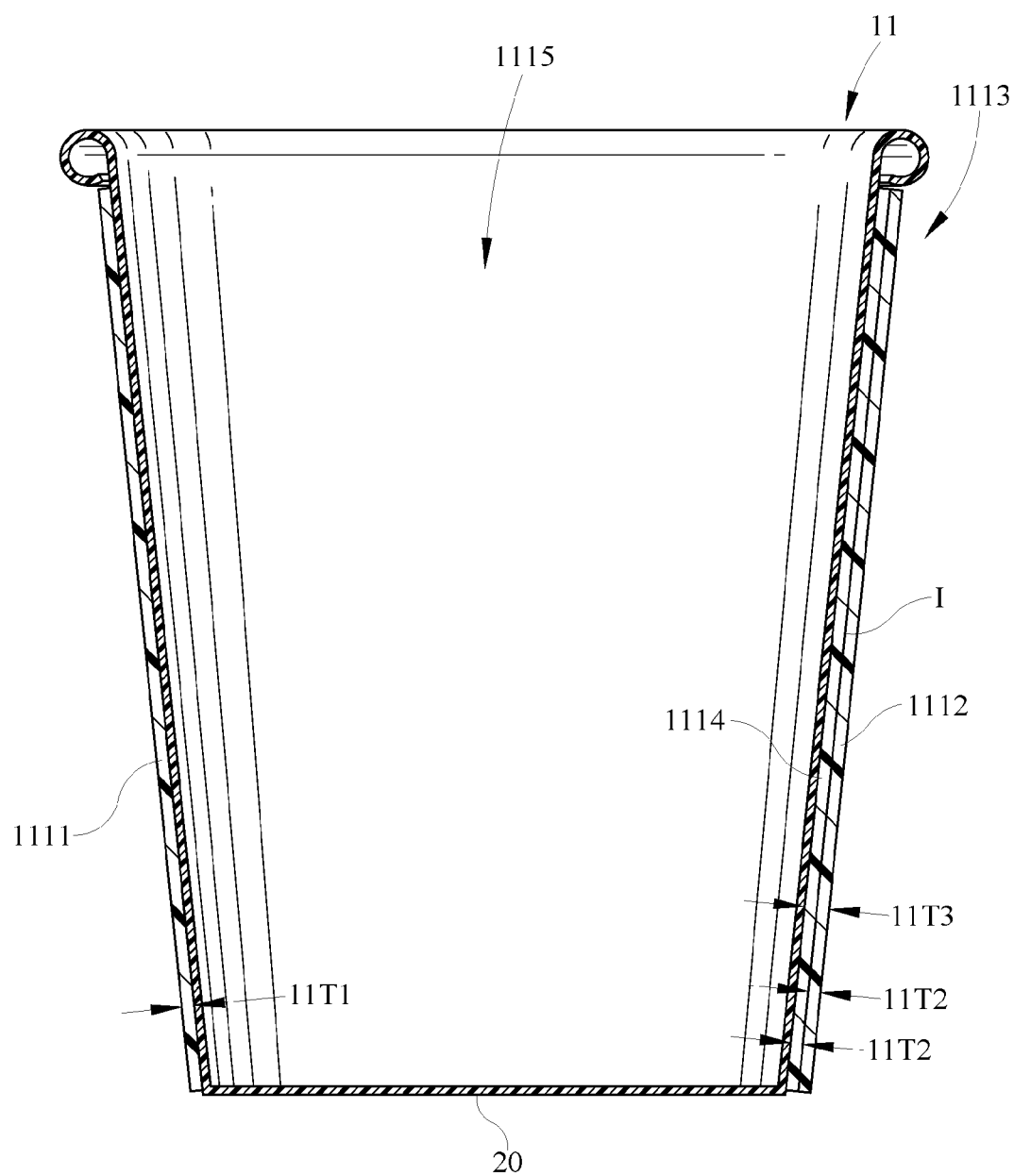
Figure 36:
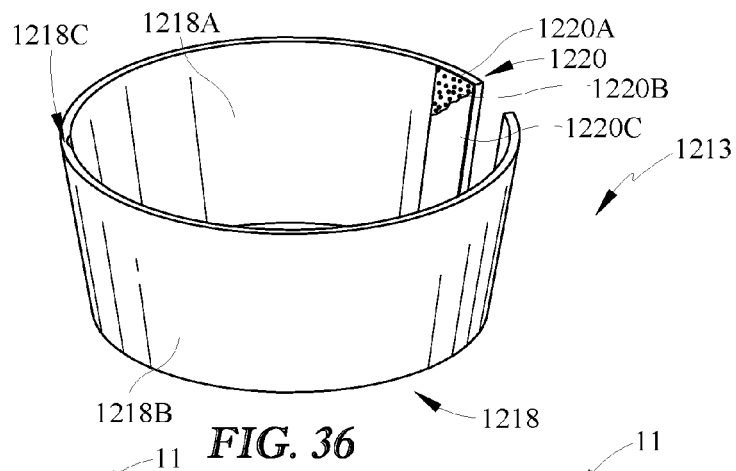
Figures 37, 38:
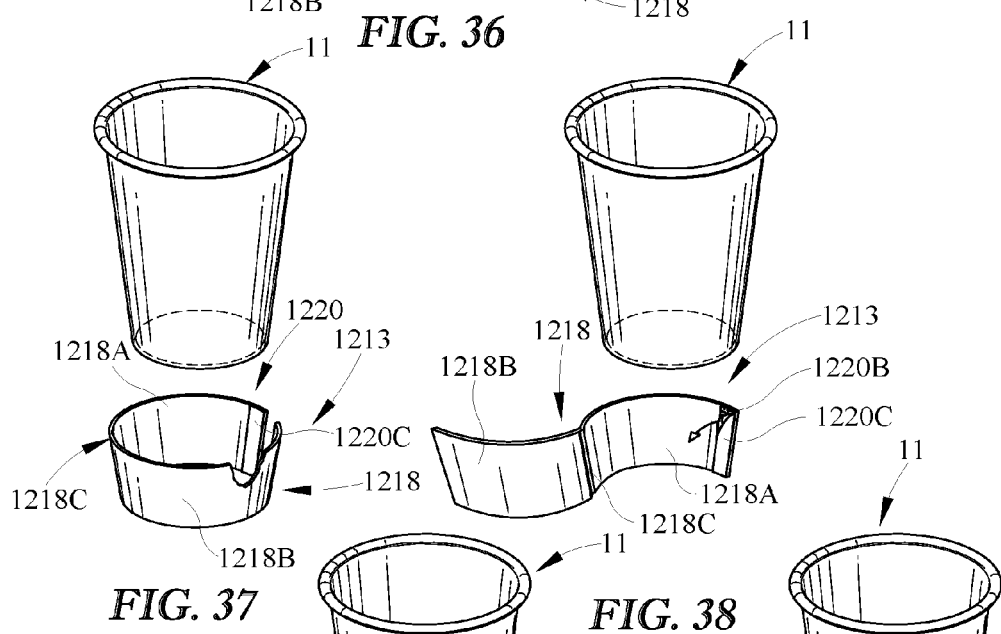
Figures 39, 40:
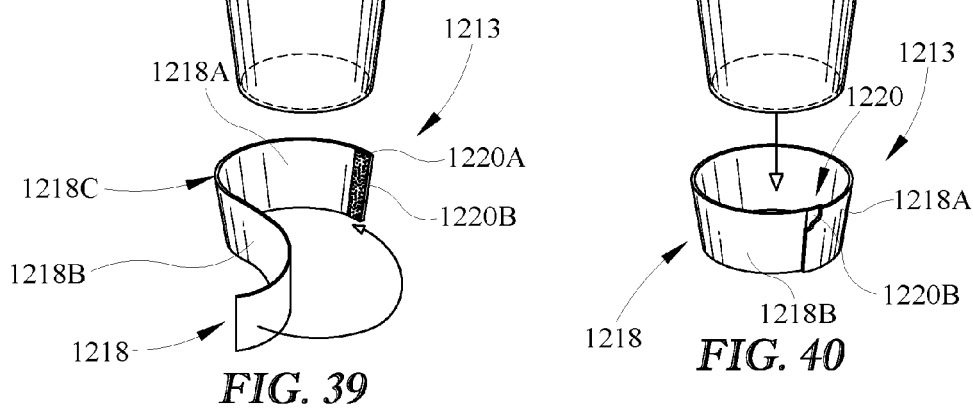

FIG. 3B is a sectional view taken along line 3B-3B of FIG. 1 showing that the insulative sleeve is formed from an insulative cellular non-aromatic polymeric material that has been plastically deformed in a localized region along overlapping first and second upright tabs included in the sleeve to provide a bridge having a reduced thickness that is similar to a thickness of the rest of the insulative sleeve;

FIG. 4 is a perspective and diagrammatic view of a sleeve-forming process in accordance with the present disclosure showing that the sleeve-forming process includes the steps of loading a laminated roll to provide a sheet including insulative cellular non-aromatic polymeric material, plastically deforming the sheet to form a deformed sheet, cutting the deformed sheet to form sleeve blanks and scrap, collecting scrap, and accumulating the sleeve blanks to form sleeve-blank stacks, storing sleeve-blank stacks for transportation or storage, loading the sleeve blanks, heating the sleeve blank, wrapping the sleeve blank around a mandrel of a sleeve-forming machine, forming the insulative sleeve by overlapping and joining the upright tabs included in the sleeve blank, accumulating insulative sleeves to form stacks of insulative sleeves, and storing stacks of insulative sleeves for use at a later time in an illustrative container-forming process suggested in FIG. 5;

FIG. 5 is a perspective and diagrammatic view of the container-forming process suggested in FIG. 4 showing that that the container-forming process includes the steps of loading stacks of cups into a container-forming machine, loading stacks of insulative sleeves into the container-forming machine, positioning the insulative sleeve on the cup, coupling the insulative sleeve to the cup to form an insulative container, and inspecting the insulative container for defects;

FIG. 6 is a perspective view of another embodiment of an insulative container in accordance with the present disclosure showing that the insulative container includes the cup and an insulative sleeve that is coupled to the side wall of the cup and arranged to extend from the rolled brim to the floor of the cup;

FIG. 7 is a partial sectional view taken along line 8-8 of FIG. 6;

FIG. 8 is a partial sectional view taken along line 8-8 of FIG. 6 showing that the insulative sleeve extends between the rolled brim and the floor of the container and that the insulative sleeve includes upright inner and outer tabs (visible on the right side of FIG. 8) arranged to overlap one another and form a bridge along a right side of the insulative container and a fence extending around the side wall and interconnecting the upright inner and outer tabs;

FIG. 8A is an enlarged dead section view of a bridge in accordance with the present disclosure showing how the insulative cellular non-aromatic polymer material has been compressed in both the first and second tabs to produce a bridge having a reduced the thickness that is similar to a thickness of the side wall in the C-shaped fence opposite the bridge;

FIG. 8B is an enlarged dead section view of a portion of the C-shaped fence of FIG. 8A showing that the insulative cellular non-aromatic polymer material has not been compressed;

FIG. 8C is an enlarged dead section view of the first and second tabs prior to mating to one another to establish the bridge;

FIG. 8D is a dead section view taken along line 8'-8' of FIG. 1 (omitting the side wall of the insulative cup) and showing that the insulative sleeve includes a C-shaped fence, an upright outer tab coupled to one end of the C-shaped fence, and an upright inner tab coupled to an opposite end of the C-shaped fence and suggested that the first and second tabs are arranged to overlap one another to establish a bridge extending between the ends of the C-shaped fence to define the interior region therebetween;

FIG. 9 is a plan view of a sleeve blank used during a sleeve-forming process to form the sleeve of FIG. 6;

FIG. 10 is an exploded assembly view of the insulative container of FIG. 6 showing that the insulative container includes, from top to bottom, the cup including the rolled brim, sleeve-shaped side wall, and floor and the insulative sleeve having a height which is about equal to a height of the sleeve-shaped side wall;

FIG. 11 is a perspective view of another embodiment of an insulative sleeve in accordance with the present disclosure showing that the insulative sleeve includes a series of generally horizontal ribs formed on an inner surface of the sleeve;

FIG. 12 is a plan view of a sleeve blank used during a sleeve-forming process to form the insulative sleeve of FIG. 11;

FIG. 13 is a sectional view taken along line 13-13 of FIG. 12;

FIG. 14 is a perspective view of another embodiment of an insulative sleeve in accordance with the present disclosure showing that the insulative sleeve includes a series of generally vertical ribs formed on an inner surface of the sleeve;

FIG. 15 is a plan view of a sleeve blank used during a sleeve-forming process to form the insulative sleeve of FIG. 14;

FIG. 16 is a sectional view taken along an arc line 16-16 of FIG. 15;

FIG. 17 is a perspective view of another embodiment of an insulative sleeve in accordance with the present disclosure showing that the insulative sleeve includes a series of ribs formed on an inner surface of the insulative sleeve and arranged in a spiral to slope downwardly;

FIG. 18 is a plan view of a sleeve blank used during a sleeve-forming process to form the insulative sleeve of FIG. 17;

FIG. 19 is a sectional view taken along line 19-19 of FIG. 18;

FIG. 20 is a perspective view of another embodiment of an insulative sleeve in accordance with the present disclosure showing that the insulative sleeve includes a series of nubs formed on an inner surface of the insulative sleeve;

FIG. 21 is a plan view of a sleeve blank used during a sleeve-forming process to form the insulative sleeve of FIG. 20;

FIG. 22 is a sectional view taken along line 22-22 of FIG. 20;

FIG. 23 is a perspective view of another embodiment of an insulative sleeve in accordance with the present disclosure showing that the insulative sleeve includes a number of protruding ribs formed in the sleeve as a result of displacing portions of the sleeve;

FIG. 24 is a plan view of a sleeve blank used during a sleeve-forming process to form the insulative sleeve of FIG. 23;

FIG. 25 is a sectional view taken along line 25-25 of FIG. 23;

FIG. 26 is an enlarged portion of FIG. 25 showing that material has been displaced in the sleeve to form the protruding ribs;

FIG. 27 is a perspective view of another embodiment of an insulative sleeve in accordance with the present disclosure showing that the insulative sleeve includes a sleeve wall and a sleeve floor coupled to the sleeve wall to define a cup-receiving space therebetween;

FIG. 28 is a plan view of a sleeve blank used during a sleeve-forming process to form the insulative sleeve of FIG. 27;

FIG. 29 is a perspective view of another embodiment of an insulative sleeve in accordance with the present disclosure showing that the insulative sleeve includes a sleeve wall and a sleeve floor coupled to the sleeve wall to define a cup-receiving space therebetween;

FIG. 30 is a plan view of a sleeve-wall blank used during a sleeve-forming process to form the sleeve wall;

FIG. 31 is a plan view of a sleeve-floor blank used during the sleeve-forming process to form the sleeve floor which is coupled to the sleeve wall to establish the insulative sleeve;

FIG. 32 is a perspective view of another embodiment of an insulative sleeve in accordance with the present disclosure showing that the insulative sleeve includes a sleeve wall having a first bridge on a left side of the insulative sleeve and a second bridge opposite the first bridge on a right side of the insulative sleeve and a sleeve floor coupled to the sleeve wall to define a cup-receiving space therebetween;

FIG. 33 is a plan view of a sleeve blank used during a sleeve-forming process to form the insulative sleeve of FIG. 27 showing that the sleeve blank includes, from left to right, a first wall panel, a sleeve floor, and a second wall panel;

FIG. 34 is a perspective view of another embodiment of an insulative container in accordance with the present disclosure showing that the insulative container includes a cup and an insulative sleeve that includes a fence having a fence thickness and a bridge having a bridge thickness that is about twice the fence thickness;

FIG. 35 is a sectional view taken along line 35-35 of FIG. 34;

FIGS. 36-40 are a series of views showing another embodiment of an insulative sleeve in accordance with the present disclosure and showing assembly of the insulative sleeve in the field;

FIG. 36 is a perspective view of another embodiment of an insulative sleeve in accordance with the present disclosure showing that the insulative sleeve is in a dis-assembled state that includes a sleeve wall having first and second panels connected together by a connecting web along a fold line and a sleeve-wall retainer including an upright tab, an adhesive layer applied to the upright tab, and a release liner coupled to the adhesive layer;

FIGS. 37-40 are a series of views showing an illustrative method of applying the insulative sleeve of FIG. 36 to a cup in the field;

FIG. 37 is a perspective view showing a cup and the insulative sleeve of FIG. 36 in the disassembled state;

FIG. 38 is a view similar to FIG. 37 with the second panel of the sleeve wall folded back away from the first panel of the sleeve wall along the connecting web to expose the sleeve-wall retainer and suggesting that the release liner is peeled away from the adhesive layer to expose the adhesive layer;

FIG. 39 is a view similar to FIG. 38 showing the release liner removed from the adhesive layer and suggesting that the sleeve-wall retainer is arranged to overlap a distal end of the second panel as suggested in FIG. 40; and FIG. 40 is a view similar to FIG. 39 showing that the sleeve-wall retainer has been arranged to overlap the distal end of the second panel to cause the insulative sleeve to be established with a cup-receiving space formed therebetween.

DETAILED DESCRIPTION

Figure 2:
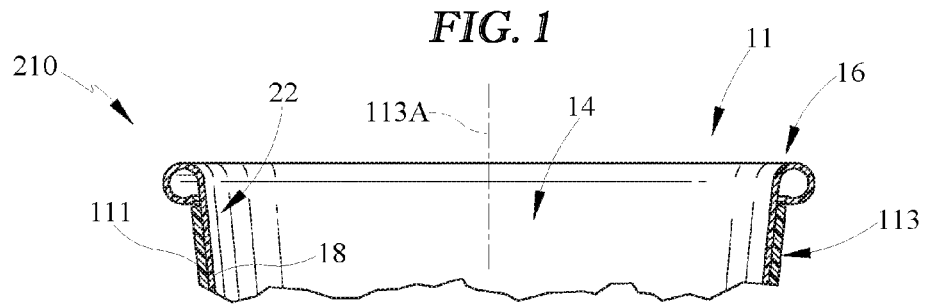
FIG. 2 is a partial sectional view taken along line 8-8 of FIG. 6 showing an upper portion of another embodiment of the insulative sleeve that is coupled to the side wall and that is shown in more detail in FIGS. 6-8.

An insulative container 110 in accordance with a first embodiment of the present disclosure is shown, for example, in FIGS. 1-3. As an example, insulative container 110 includes a cup 11 and a first embodiment of an insulative sleeve 113 as shown in FIGS. 1-3. A container-forming process 46, 47 used to make the insulative container 110 is shown in FIGS. 4 and 5. Another embodiment of an insulative container 210 in accordance with the present disclosure is illustrated in FIGS. 6-10. Other embodiments of insulative sleeves 313, 413, 513, 613, 713, 813, 913, 1013, 1113, 1213, and 1313 that are in accordance with the present disclosure are shown in FIGS. 11-36.

An insulative container 110 in accordance with the present disclosure includes a cup 11 and an insulative sleeve 113 as shown in FIGS. 1, 3, and 4. Cup 11 includes body 12 formed to include an interior region 14 and a rolled brim 16 coupled to body 12 as shown, for example, in FIG. 1. Body 12 includes a side wall 18 and a floor 20 coupled to side wall 18 to define an interior region 14 therebetween. In one illustrative example, cup 11 may be formed of polypropylene using a thermoforming process.

Insulative sleeve 113 illustratively comprises a strip 82 of insulative cellular non-aromatic polymeric material. Strip 82 of insulative cellular non-aromatic polymeric material is configured to provide means for insulating a beverage, dessert or other substance placed in interior region 14 of cup 11 while providing resistance to deformation and puncture and for providing an exterior surface that is suitable for printing graphics and other information thereon.

Insulative sleeve 113 includes a region 101 having localized plastic deformation that provides segments of insulative sleeve 113 that exhibit higher material density than neighboring segments of insulative sleeve 113 in accordance with the present disclosure is shown in FIGS. 1 and 3. As an example, insulative sleeve 113 is made using an illustrative sleeve-forming process 46 suggested in FIG. 4. Insulative container 110 is made using an illustrative container-forming process 47 using a sleeve blank 300 as shown, for example, in FIG. 5. Strip 82 of insulative cellular non-aromatic polymeric material used to form insulative sleeve 113 is shown in FIGS. 3A and 3B.

Insulative sleeve 113 includes an upright inner tab 114, an upright outer tab 112, and an upright fence 111 extending between inner and outer tabs 114, 112 as suggested in FIG. 8D. Upright inner tab 114 is configured to provide the first material segment having the higher first density in the region 101 of sleeve 113. Upright outer tab 112 is arranged to mate with upright inner tab 114 along an interface I therebetween as suggested in FIG. 8D. Upright fence 111 is arranged to interconnect upright inner and outer tabs 114, 112 and surround interior region 14. Upright fence 111 is configured to provide the second material segment having the lower second density in the region 101 insulative sleeve 113 and cooperate with upright inner and outer tabs 114, 112 to form insulative sleeve 113 as suggested in FIG. 8D. Region 101 of insulative sleeve 113 in which localized plastic deformation is enabled by the insulative cellular non-aromatic polymeric material is where upright inner and outer tabs 114, 112 overlap along interface I as suggested in FIG. 8D.

Upright fence 111 of insulative sleeve 113 is C-shaped in a horizontal cross-section and each of upright inner and outer tabs 114, 112 has an arcuate shape in a horizontal cross-section as suggested in FIG. 8D. Upright fence 111 includes an upright left side edge 111L and an upright right side edge 111R that is arranged to lie in spaced-apart confronting relation to upright left side edge 111L. Upright outer tab 112 is configured to have the higher first density and mate with upright inner tab 114 also characterized by the higher first density to establish a bridge 112, 114 arranged to interconnect upright left and right side edges 111L, 111R of upright fence 111. Bridge 112, 114 is formed of plastically deformed material having the higher first density.

As shown, for example, in FIG. 1, upright fence 111 of insulative sleeve 113 has a sleeve height H1. Cup 11 has a cup height D1. As shown in FIG. 1, sleeve height H1 is less than cup height D1.

Insulative sleeve 113 includes a pair of tabs 114, 112 that mate to provide insulative sleeve 113 with a frustoconical shape in the illustrative embodiment shown in FIGS. 8A, 8C, and 8D. Upright inner tab 114 includes an inner surface 114i bounding a portion of interior region 14 and an outer surface 114o facing toward upright outer tab 112 as shown in FIGS. 8C and 8D. Upright outer tab 112 includes an inner surface 112i facing toward interior region 14 and mating with outer surface 114o of upright inner tab 114 to define the interface I between upright inner and outer tabs 114, 112. Upright outer tab 112 further includes an outer face 112o facing away from upright inner tab 114. Each of inner and outer surfaces of upright inner and outer tabs 114, 112 has an arcuate shape in a horizontal cross-section as suggested in FIG. 8C and subtends an acute angle of less than 20° as suggested in FIG. 8D.

Upright fence 111 is C-shaped in a horizontal cross-section and each of upright inner and outer tabs 114, 112 has an arcuate shape in a horizontal cross-section as suggested in FIG. 8D. Upright fence 111 includes an upright left side edge 111L and an upright right side edge 111R that is arranged to lie in spaced-apart confronting relation to upright left side edge 111L in FIG. 8C. Upright outer tab 112 is configured to have the higher first density and mate with upright inner tab 114 also characterized by the higher first density to establish a bridge 112, 114 arranged to interconnect upright left and right side edges 111L, 111R of upright fence 111. Bridge 112, 114 is formed of plastically deformed material having the higher first density.

Upright fence 111 has an inner surface 111i bounding a portion of interior region 14 and an outer surface 111o facing away from interior region 14 and surrounding inner surface 111i of upright fence 111 as shown, or example, in FIG. 8D. Outer surface 111o cooperates with inner surface 111i of upright fence 111 to define a first thickness T1 therebetween. Upright inner tab 114 includes an inner surface 114i bounding a portion of interior region 14 and an outer surface 114o facing toward upright outer tab 112. Upright outer tab 112 includes an inner surface 112i facing toward interior region 14 and mating with outer surface 114O of upright inner tab 114 to define the interface I between upright inner and outer tabs 114, 112. Upright outer tab 112 further includes an outer face 112o facing away from upright inner tab 114. Inner and outer surfaces of upright inner tab 114 cooperate to define a second thickness T2I therebetween that is less than the first thickness T1. Inner and outer surfaces of upright outer tab 112 cooperate to define a third thickness T2O that is less than the first thickness T1.

Insulative sleeve 113 is made from a strip 82 of insulative cellular non-aromatic polymeric material. Insulative cellular non-aromatic polymeric material comprises, for example, a polypropylene base resin having a high melt strength, one or both of a polypropylene copolymer and homopolymer resin, and one or more cell-forming agents. As an example, cell-forming agents may include a primary nucleation agent, a secondary nucleation agent, and a blowing agent defined by gas means for expanding the resins and to reduce density. In one example, the gas means comprises carbon dioxide. In another example, the base resin comprises broadly distributed molecular weight polypropylene characterized by a distribution that is unimodal and not bimodal. Reference is hereby made to U.S. application Ser. No. 13/491,327 filed Jun. 7, 2012 and titled POLYMERIC MATERIAL FOR AN INSULATIVE CONTAINER for disclosure relating to such insulative cellular non-aromatic polymeric material, which application is hereby incorporated in its entirety herein.

An insulating sleeve in accordance with the present disclosure may optionally include, as shown in FIGS. 11-26, vertical, horizontal, spiral or other configuration of ribs or rib segments, hoops, bumps, nubs, or other projections, or grooves, slots, channels, depressions or the like on the inner surface of the sleeve that creates an air gap between side wall 18 of cup 11 and the insulating sleeve. This air gap forms an insulating barrier to minimize transfer of heat from a hot beverage through cup 11 and/or the insulating sleeve to a user's hand (and, conversely, transfer of heat from a user's hand through insulative sleeve 113 and side wall 18 to the beverage). As shown in FIGS. 4 and 5, insulative container 110 is formed in an illustrative container-forming process 46, 47.

As shown in FIGS. 2 and 3, insulative sleeve 113 is formed during sleeve-forming process 46 (see FIG. 4). Upright fence 111 has a first thickness T1 (see FIG. 8) and first and second upright tabs 114 (see FIG. 8), 112 (see FIG. 8) each have a second thickness T2 (see FIG. 8). As suggested in FIG. 1, second thickness T2 is about half to first thickness T1. As a result, bridge 114, 112 formed by overlapping and coupling upright tabs 114, 112 has a third thickness T3 which about equal to first thickness T1. In one exemplary embodiment the insulative sleeve 113 may be formed in the forming apparatus and coupled with cup 11. Insulative sleeve 113 may be manufactured, stored, shipped, and/or sold separately with a self-locking die cut feature. The self-locking feature may have various shapes to promote retention.

Insulative sleeve 113 is made using sleeve-forming process 46 as shown, for example, in FIG. 4. Sleeve-forming process 46 includes a laminated-roll loading step 461A, a compressing step 462A, a cutting step 463A, an accumulating sleeve blanks step 464A, a storing sleeve blanks step 465A, a loading sleeve blank step 461B, heating sleeve blanks step 462B, wrapping sleeve blanks step 463B, forming sleeve step 464B, accumulating sleeves step 465B, and storing stacks of sleeves step 466B as shown in FIG. 4.

Laminated-roll loading step 461A loads laminated roll 86 onto a cutting machine such as a die cutting machine or metal-on-metal stamping machine. As a result, laminated sheet 80 is drawn into the cutting machine for processing. Compressing step 462A compresses portions of laminated sheet 80 to form a compressed sheet. Cutting step 463A cuts compressed sheet to cause sleeve blank 300 to be cut from a laminated sheet 80. As an example, cutting step 463A and compressing step 462A may be combined such that they are performed generally at the same time on the same piece of equipment. Accumulating sleeve blanks step 464A accumulates sleeve blanks 300 into a stack 95 of sleeve blanks. Storing sleeve blanks step 465A stores stack 95 of sleeve blanks until ready for use in loading sleeve blanks step 461B. Loading sleeve blanks step 461B loads stack 95 of sleeve blanks for processing by a sleeve-forming machine. Heating sleeve blanks step 462B applies heat 102 to sleeve blank 300. Wrapping sleeve blanks step 463B wraps heated sleeve blank 300 around a mandrel included in sleeve-forming machine. Forming sleeve step 464B forms bridge 114, 112 by overlapping and compressing upright tabs 112, 114 with primary and auxiliary clamps included in sleeve-forming machine. Accumulating sleeves step 465B accumulates sleeves 113 into a stack 97 of sleeves. Storing stacks of sleeves step 466B stores stack 97 of sleeves for use in later container-forming process 47.

Insulative container 110 is made using a container-forming process 47 as shown in FIG. 5. Container-forming process 47 includes a loading cups step 471, a loading sleeves step 472, a positioning sleeve on cup step 473, a sleeve coupling step 474, and an inspecting step 475 as shown in FIG. 5. Loading containers step 471 loads container stack 124 onto a container-forming machine. Loading sleeves step 472 loads a stack 97 of sleeves onto the container-forming machine. Positioning sleeve on cup step 473 positions sleeve 113 on cup 11. Sleeve coupling step 474 couples sleeve 113 to cup 11 using heat for example to establish insulative container 110. However, sleeve 113 may be coupled by adhesive, friction fit, or any other suitable alternative. Inspecting step 475 inspects insulative container 110 for defects before passing good containers onto container-packaging stage 48 as suggested in FIG. 5.

As shown in FIG. 3A, insulative sleeve 113 is made from a sheet 80. Sheet 80 includes a skin 81 and strip 82 of insulative cellular polymeric material. Skin 81, includes, for example, a film layer 811, an ink layer 812, and an adhesive layer 810 as shown in FIG. 3A. Adhesive layer 810 is used, for example, to laminate skin 81 to strip 82 so that ink layer 812 is trapped between film layer 811 and adhesive layer 810.

In another exemplary embodiment of a sleeve-forming process, sleeve-forming process 46 is modified by not laminating a skin 81 to strip 82 of insulative cellular non-aromatic polymeric material. As a result, the skin is entirely omitted and printing may done directly on strip 82 of insulative cellular non-aromatic polymeric material.

Side wall 18 of cup 11 extends between rolled brim 16 and floor 20 as shown in FIG. 3. Side wall 18 includes a top portion 22 of body 12 that is coupled to rolled brim 16 and a bottom portion 24 arranged to interconnect floor 20 and top portion 22. Top portion 22 is arranged to extend in a downward direction toward floor 20 and is coupled to bottom portion 24 that is arranged to extend in an opposite upward direction toward rolled brim 16. Top portion 22 and rolled brim 16 cooperate to form a mouth 32 that is arranged to open into interior region 14 as shown in FIG. 1.

Insulative sleeve 113 is arranged to surround and embrace an exterior surface of a hot-beverage drink cup 11 to provide a grippable low-temperature thermal barrier that can be gripped by a consumer. Insulative sleeve 113 comprises a sheet 80 comprising insulative cellular non-aromatic polymeric material configured to provide means for enabling localized plastic deformation in sheet 80 to provide a plastically deformed first material segment having a first density located in a first portion of sheet 80 and a second material segment having a second density lower than the first density located in an adjacent second portion of sheet 80 without fracturing the insulative cellular non-aromatic polymeric material so that a predetermined insulative characteristic is maintained in sheet 80.

Sheet 80 is arranged to surround a vertical central axis 113A as suggested in FIGS. 1 and 3. Sheet 80 includes an upright inner tab 114 arranged to extend upwardly along and in spaced-apart relation to vertical central axis 113A and configured to provide the first material segment having the first density. Sheet 80 also includes an upright outer tab 112 arranged to extend upwardly along and in spaced-apart relation to vertical central axis 113A and to mate with upright inner tab 114 along an interface I therebetween, and an upright fence 111 arranged to interconnect the upright inner and outer tabs 114, 112 and surround vertical central axis 113A and configured to provide the second material segment having the second density and cooperate with upright inner and outer tabs 114, 112 to form sleeve-shaped side wall 18. Fence 111 has a substantially frustoconical shape as suggested in FIGS. 1 and 3. Each of upright inner and outer tabs 114, 112 has an arcuate shape.

Upright inner tab 114 includes an inner surface providing means for mating with a hot-beverage drink cup 11 and an outer surface facing toward upright outer tab 112 as suggested in FIGS. 8C and 8D. Upright outer tab 112 includes an inner surface mating with the outer surface of upright inner tab 114 to define the interface I between upright inner and outer tabs 114, 112. Upright outer tab 112 further includes an outer face facing away from upright inner tab 114. Each of the inner and outer surfaces of upright inner and outer tabs 114, 112 has an arcuate shape in a horizontal cross-section and subtends an acute angle of less than 20°. Upright fence 111 is C-shaped in a horizontal cross-section. Each of upright inner and outer tabs 114, 112 has an arcuate shape in a horizontal cross-section.

Upright fence 111 includes an upright left side edge 111L and an upright right side edge 111R arranged to lie in spaced-apart confronting relation to upright left side edge 111L. Upright outer tab 112 is configured to have the first density and mate with the upright inner tab to establish a bridge arranged to interconnect upright left and right side edges 111L, 111R of the upright fence and formed of plastically deformed material having the first density.

Upright fence 111 has an inner surface facing toward vertical central axis 113A and providing means for mating with a hot-beverage drink cup 11. Upright fence 111 also has an outer surface facing away from vertical central axis 113A from interior region 14 and surrounding the inner surface of upright fence 111 and cooperating with the inner surface of upright fence 111 to define a first thickness therebetween.

Upright inner tab 114 includes an inner surface facing toward vertical central axis 113A and providing means for mating with hot-beverage drink cup 11 and an outer surface facing toward upright outer tab 112. Upright outer tab 112 includes an inner surface facing toward vertical central axis 113A and mating with the outer surface of upright inner tab 114 to define interface I between upright inner and outer tabs 114, 112.

Upright outer tab 112 further includes an outer face facing away from the upright inner tab 114. The inner and outer surfaces of upright inner tab 114 cooperate to define a second thickness therebetween that is about half of the first thickness as suggested in FIG. 8D. Inner and outer surfaces of upright outer tab 112 cooperate to define a third thickness that is about half of the first thickness as suggested in FIG. 8D.

Another embodiment of an insulative container 210 in accordance with the present disclosure is shown in FIGS. 6-10. Insulative container 210 includes cup 11 and insulative sleeve 213 as shown in FIG. 6. Insulative sleeve 213 is similar to sleeve 113 except that insulative sleeve 213 has a sleeve height H1 that about equal to a cup height D1 as shown in FIG. 6.

As an example, insulative sleeve 213 is formed using sleeve blank 300 during sleeve-forming process 46 as shown, for example, in FIG. 4. Blank 300 includes a first side 302 and an opposite second side (not shown). Blank 300 has a first arcuate edge 306 that coincides with a radius 308 centered on an axis 310. A second arcuate edge 312 coincides with a radius 314 centered on axis 310. A first linear edge 316 coincides with a first ray emanating from the axis 310 and a second linear edge 318 coincides with a second ray emanating from the axis 310. When the blank 300 is wrapped such that first linear edge 316 overlaps in juxtaposition with second linear edge 318, the insulative sleeve 213 defines a frustoconical surface 320 shown in FIG. 6. The overlapped linear edges 316 and 318 may be secured in any of a number of ways including a mechanical connection created by heating the edges 316 and 318 to bonding of the insulative cellular non-aromatic polymeric material. The edges 316 and 318 may be treated with an adhesive to secure the edges 316 and 318 to one another.

In yet another embodiment of an insulative sleeve 313 formed from a sleeve blank 322, insulative sleeve 313 includes a plurality of generally horizontal ribs 328 on an inner surface 326 of an assembled insulative sleeve 313 as shown in FIGS. 11-13. Sleeve blank 322 is formed with a first thickness 322T1 and in a compressing material sheet step of a sleeve forming process, depressions 324 are formed by reducing the thickness to 322T2 as shown in FIG. 13. Upon completion of the compressing material sheet step, blank 322 includes a number of areas of localized plastic deformation that form depression 324 with thickness 322T2 and ribs 328 which have no deformation and thickness 322T1. As shown diagramatically in FIG. 11, depressions 324 and ribs 328 cooperate to form an air gap 301 between inner surface 326 of insulative sleeve 313, an exterior surface 102 of cup 11, and a pair of neighboring ribs 328A, 328B.

Blank 322 is formed with a first linear edge 330 and a second linear edge 334. Ribs 328 are formed to abut second linear edge 334 at a first end and are spaced apart from first linear edge 330 by a distance 332 so that when first linear edge 330 overlaps second linear edge 334 during the wrapping sleeve blank step of the sleeve-forming process, the first and second ends of ribs 328 do not overlap. This reduces the amount of material that must be compressed during the wrapping sleeve blank step. Ribs 328 are positioned to engage an outer surface of a cup, such as cup 11, such that the inner surface 326 of depressions 324 are spaced apart from the outer surface of the cup to provide an air gap with only the ribs 328 engaging the outer surface of the cup. The air gap is insulative so that when a user grips an outer surface 338 of insulative sleeve 313, heat transfer from the cup to a user's hand is impeded.

In still yet another embodiment of an insulative sleeve 413 formed from a sleeve blank 422, insulative sleeve 413 includes a plurality of vertical ribs 428 on an inner surface 426 of an assembled insulative sleeve 413 as shown in FIGS. 14-16. Sleeve blank 422 is formed with a first thickness 422T1 and in a compressing material sheet step of a sleeve forming process, depressions 424 are formed by reducing the thickness to 422T2 as shown in FIG. 16. Upon completion of the compressing material sheet step, blank 422 includes a number of areas of localized plastic deformation that form depression 424 with thickness 422T2 and ribs 428 which have no deformation and thickness 422T1.

Blank 422 is formed with a first linear edge 430, a first arcuate edge 440, a second linear edge 434, and a second arcuate edge 442. Ribs 428 are formed to extend from first arcuate edge 440 to second arcuate edge 442. First linear edge 430 and second linear edge 434 each lie along a ray that emanates from a common axis that defines the center of curvature of both first arcuate edge 440 and second arcuate edge 442. Each rib 428 also lies along a ray that extends from the common axis 444. Ribs 428 are positioned to engage an outer surface of a cup, such as cup 11, such that the inner surface 426 of depressions 424 are spaced apart from the outer surface of the cup to provide an air gap with only the ribs 428 engaging the outer surface of the cup. The air gap is insulative so that when a user grips an outer surface 438 of insulative sleeve 413, heat transfer from the cup to a user's hand is impeded.

In yet another embodiment of an insulative sleeve 513 formed from a sleeve blank 522, insulative sleeve 513 includes a plurality of helical ribs 528 on an inner surface 526 of an assembled insulative sleeve 513 as shown in FIGS. 17-19. Sleeve blank 522 is extruded with a first thickness 522T1 and in a compressing material sheet step of a sleeve forming process, depressions 524 are formed by reducing the thickness to 522T2 as shown in FIG. 19. Upon completion of the compressing material sheet step, blank 522 includes a number of areas of localized plastic deformation that form depression 524 with thickness 522T2 and ribs 528 which have no deformation and thickness 522T1.

Blank 522 is formed with a first linear edge 530, a first arcuate edge 540, a second linear edge 534, and a second arcuate edge 542. Ribs 528 are formed to extend along axes that are perpendicular to second linear edge 534. Ribs 528 extend to abut either second arcuate edge 542 or first linear edge 530. Ribs 528 are positioned to engage an outer surface of a cup, such as cup 11, such that the inner surface 526 of depressions 524 are spaced apart from the outer surface of cup to provide an air gap with only the ribs 528 engaging the outer surface of cup 11. The air gap is insulative so that when a user grips an outer surface 538 of insulative sleeve 513, heat transfer from the cup to a user's hand is impeded.

In another embodiment of an insulative sleeve 613 formed from a sleeve blank 622, insulative sleeve 613 includes a plurality of nubs or protrusions 628 on an inner surface 626 of an assembled insulative sleeve 613 as shown in FIGS. 20-22. Sleeve blank 622 is extruded with a first thickness 622T1 and in a compressing material sheet step of a sleeve forming process, protrusions 628 remain after reducing the remainder of blank 622 to thickness to 622T2 as shown in FIG. 22. Upon completion of the compressing material sheet step, blank 622 includes a number of protrusions 628 which have no deformation and thickness 622T1.

Blank 622 is formed with a first linear edge 630, a first arcuate edge 640, a second linear edge 634, and a second arcuate edge 642. Protrusions 628 are spaced in rows 624 with each row 624 lying along an arc that is parallel to the first arcuate edge 640 and second arcuate edge 642. Protrusions 628 are positioned to engage an outer surface of a cup, such as cup 11, such that the inner surface 626 of insulative sleeve 613 is spaced apart from the outer surface of the cup to provide an air gap with only the protrusions 628 engaging the outer surface of the cup. The air gap is insulative so that when a user grips an outer surface 638 of insulative sleeve 613, heat transfer from the cup to a user's hand is impeded.

In yet another embodiment of an insulative sleeve 713 formed from a sleeve blank 722, insulative sleeve 713 includes a plurality of generally horizontal ribs 728 on an inner surface 736 of an assembled insulative sleeve 713 as shown in FIGS. 23-26. Sleeve blank 722 is extruded with a first thickness 722T1 and in a displacing material sheet step of a sleeve forming process, ribs 728 are formed by displacing material. Upon completion of the displacing material sheet step, blank 722 includes a number of areas of localized plastic deformation that form ribs 728 which have thickness 722T1, but with portions of the blank 722 offset to define ribs 728. Portions of blank 722 are reduced to a thickness 722T2 due to plastic deformation and elongations as the material is displaced.

The displacing material sheet step may be performed by a thermoforming process in which blank 722 is thermoformed. As a result, thicknesses 722T1 and 722T2 are maximized so that the insulative properties of insulative sleeve 713 are maximized.

Blank 722 is formed with a first linear edge 730 and a second linear edge 734. Ribs 728 are formed to abut second linear edge 734 at a first end and are spaced apart from first linear edge 730 by a distance 732 so that when first linear edge 730 overlaps second linear edge 734 during a wrapping sleeve blank step of the sleeve forming process, the first and second ends of ribs 728 do not overlap. This reduces the amount of material that must be compressed during wrapping sleeve blank process. Ribs 728 are positioned to engage an outer surface of a cup, such as cup 11, such that the inner surface 736 of depressions 724 are spaced apart from the outer surface of the cup to provide an air gap with only the ribs 728 engaging the outer surface of the cup. The air gap is insulative so that when a user grips an outer surface 738 of insulative sleeve 713, heat transfer from the cup to a user's hand is impeded.

Another embodiment of an insulative sleeve 813 in accordance with the present disclosure is shown in FIGS. 27 and 28. Insulative sleeve 813 includes an upright sleeve wall 818 and a sleeve floor 820 as shown in FIG. 27. Sleeve blank 822 is extruded with a first thickness and in a compressing material sheet step of a sleeve forming process, a fold line 828 is formed by compressing material to a relatively thinner second thickness. Sleeve floor 820 includes a floor platform 821 and a floor-retention tab 822A that is coupled to sleeve wall 818 during sleeve forming as shown in FIG. 27. After sleeve forming, sleeve floor 820 and sleeve wall 818 cooperate to define a cup-receiving space 814 therebetween.

Still yet another embodiment of an insulative sleeve 913 in accordance with the present disclosure is shown in FIGS. 29-31. Insulative sleeve 913 includes an upright sleeve wall 918 and a sleeve floor 920 as shown in FIGS. 29-31. Sleeve-wall blank 922 and sleeve-floor blank 924 are extruded with a first thickness and in a compressing material sheet step of a sleeve forming process, fold lines 928 are formed by compressing material to a relatively thinner second thickness in sleeve-floor blank 924 as shown in FIG. 31. Sleeve floor 920 includes a floor platform 921 and four floor-retention tabs 922A, 922B, 922C, 922D that are coupled to sleeve wall 918 during sleeve forming as shown in FIG. 29. After sleeve forming, sleeve floor 920 and sleeve wall 918 cooperate to define a cup-receiving space 914 therebetween.

In another embodiment, an insulative sleeve 1013 has a generally cylindrical shape with a lower tab 1002 as shown in FIG. 32. The lower tab 1002 is used to support a cylindrical drinking vessel, such as an aluminum can, for example, while insulative sleeve 1013 is positioned on the cylindrical drinking vessel. Insulative sleeve 1013 includes an opening into which the vessel is positioned and lower tab 1002 provides a stop so that the vessel is supported on lower tab 1002 to position insulative sleeve 1013. Insulative sleeve 1013 differs from sleeves 213 and 113 in that insulative sleeve 1013 has two joints 1006 and 1008 where material is joined to form the insulative sleeve 1013.

A blank 1022 for insulative sleeve 1013 includes two generally rectangular shaped portions 1012, 1014 interconnected by lower tab 1002 as shown in FIG. 33. A first linear edge 1016 of portion 1012 mates with a first linear edge 1018 of portion 1014 and the edges are overlapped in juxtaposition so that they can be joined to form joint 1006. Similarly, a second linear edge 1020 of portion 1012 mates with a second linear edge 1021 of portion 1014 overlapped and juxtaposed therewith to form joint 1008. The joints 1006 and 1008 are formed by heating the material and positioning the edges so that the insulative cellular non-aromatic polymeric material is coupled together. In other embodiments, the joints may be formed by applying adhesive to the respective edges. In either approach, pressure may be applied to assist with the joining. In other embodiments, the joints may be formed by forming a slit along one edge and forming a tab along the opposite edge and causing the tab to be inserted into the slit and retained therein.

In other embodiments, joints 1006 and 1008 may be secured by using a hook and loop fastening system, such as VELCRO®, for example. The insulative cellular non-aromatic polymeric material has sufficient flexibility to allow the insulative sleeve 1013 to be formed as a blank in a flat condition and assembled by a consumer. Similarly, sleeves 213 and 113 may use hook and loop fastening systems in some embodiments, such that the sleeves 213 and 113 can be shipped to a consumer as flat blanks and assembled by a consumer or at a point of sale. It should be understood that insulative sleeve 1013 may be formed with various surface discontinuities, including those discussed with regard to sleeves 313, 413, 513, 613, and 713 above.

Another embodiment of an insulative sleeve 1113 in accordance with the present disclosure is shown in FIGS. 34 and 35. Insulative sleeve 1113 includes an upright inner tab 1114, an upright outer tab 1112, and an upright fence 1111 extending between inner and outer tabs 1114, 1112 as suggested in FIGS. 34 and 35. Upright inner tab 1114 is arranged to extend upwardly from floor 20 of cup 11. Upright outer tab 1112 is arranged to extend upwardly from floor 20 and to mate with upright inner tab 1114 along an interface I therebetween as suggested in FIG. 35. Upright fence 1111 is arranged to interconnect upright inner and outer tabs 1114, 1112 and surround cup-receiving space 1115.

Upright fence 1111 of insulative sleeve 1113 is C-shaped in a horizontal cross-section and each of upright inner and outer tabs 1114, 1112 has an arcuate shape in a horizontal cross-section. Upright fence 1111 has a first thickness 11T1 and first and second upright tabs 1114, 1112 each have a second thickness 11T2. As suggested in FIG. 34 and shown in FIG. 35, second thickness 11T2 is about equal to first thickness 11T1. As a result, bridge 1114, 1112 formed by overlapping and coupling upright tabs 1114, 1112 has a third thickness 11T3 which about twice first and second thicknesses 11T1, 11T2.

Another embodiment of an insulative sleeve 1213 in accordance with the present disclosure is shown in FIGS. 36-40. Insulative sleeve 1213 includes a sleeve wall 1218 and a sleeve-wall retainer 1220 as shown, for example in FIG. 36. Sleeve wall 1218 includes a first sleeve panel 1218A, a second sleeve panel 1218B spaced-apart from first sleeve panel 1218A, and a connecting web 1218C positioned to lie between and interconnect first and second sleeve panels 1218A, 1218B as shown in FIGS. 36 and 38.

Sleeve-wall retainer 1220 includes an upright tab 1220A, an adhesive layer 1220B, and a release liner 1220C as shown in FIG. 36. Upright tab 1220A is coupled to a free end of first sleeve panel 1218A opposite connecting web 1218C. Adhesive layer 1220B is placed on upright tab 1220A and release liner 1220C is placed on adhesive layer 1220B to locate adhesive layer 1220B between release liner 1220C and upright tab 1220A until assembly of insulative sleeve 1213 in the field.

In example of use, insulative sleeve 1213 may be assembled and coupled to a cup 11 in the field. As shown in FIG. 37, insulative sleeve 1213 is in a dis-assembled state in spaced-apart relation to cup 11. Second sleeve panel 1218B is folded back away from first sleeve panel 1218A about connecting web 1218C to expose sleeve retainer 1220 as suggested in FIG. 38. Release liner 1220C is pulled away from adhesive layer 1220B to expose adhesive layer 1220B as shown in FIG. 39. Upright tab 1220A and adhesive 1220B are arranged to overlap a free end of second sleeve panel 1218B to for insulative sleeve 1213 as shown in FIG. 40. Cup 11 is inserted into and coupled to insulative sleeve 1213 as suggested in FIG. 40. As an example, insulative sleeve 1213 may be coupled to cup 11 by friction interference or any other suitable method.

The insulative cellular non-aromatic polymeric material used to produce the insulative sleeves 213 and 113 and the variants of those sleeves is somewhat flexible and capable of expanding slightly under load to allow a properly sized sleeve to grip a vessel with some level of bias.

It is within the scope of the present disclosure to form insulative sleeves 813, 913, 1013, 1113, and 1213 with various patterns, including those discussed with regard to sleeves 313, 413, 513, 613, and 713 above. The various patterns may be formed by forming localized areas of plastic deformation in each insulative sleeve. An example, the patterns may be formed by compression portions of the sleeve such that the pattern is made from uncompressed portions. As another example, the patterns may be formed by compressing portions of the sleeve such that the pattern is made from the compressed portions. In still yet another example, the patterns may be formed by deforming portions of the sleeve so that thicknesses throughout the sleeve are maximized. In yet another example, combinations of deformation and compression may be used.

The insulative sleeve as described hereinabove provides the cup with strength and insulation. A feature of the thermoformed cup with an insulative sleeve of the present disclosure is that the thermoformed cup is seamless, yet the insulating sleeve provides desired strength, insulation, and a printable surface. The thermoformed cup has a brim without a seam, thereby providing a lid seal which reduces potential leakage compared to expanded polystyrene cups (which have seams). Another feature of the thermoformed cup and insulative sleeve of the present disclosure is that the desired strength and insulation levels are attained, but the cup side walls have a desirable level of puncture resistance. The present disclosure also provides for an insulative sleeve which can be provided separate from the cup.

The insulative sleeve made of insulative cellular non-aromatic polymeric material as described in the present disclosure can also be used or adapted for use with structures other than containers. As an example, the insulative cellular non-aromatic polymeric material may used as, but not limited to, a window sill seal, pipe wrap, or other applications where a low density, light weight, thin, material with good insulation is desired.

In an alternative exemplary embodiment, the cup, base, or body may be made of a material other than a thermoformed material. As example, the cup, base, or body may be made of an injection molded material or any other suitable alternative.

The invention claimed is:

1. An insulative sleeve for surrounding and embracing an exterior surface of a hot-beverage drink cup to provide a grippable low-temperature thermal barrier that can be gripped by a consumer, the sleeve comprising a sheet comprising insulative cellular non-aromatic polymeric material having localized plastic deformation in the sheet having a plastically deformed first material segment having a first density located in a first portion of the sheet and a second material segment having a second density lower than the first density located in an adjacent second portion of the sheet without fracturing the insulative cellular non-aromatic polymeric material so that a predetermined insulative characteristic is maintained in the sheet, wherein the insulative cellular non-aromatic polymeric material comprises a polypropylene base resin, at least one nucleation agent, and at least one blowing agent configured to expand the polypropylene base resin to reduce density, and wherein the insulative cellular non-aromatic polymeric material further comprises a polypropylene secondary resin.

2. The insulative sleeve of claim 1, wherein the sleeve is arranged to surround a vertical central axis and includes an upright inner tab arranged to extend upwardly along and in spaced-apart relation to the vertical central axis and is configured to provide the first material segment having the first density, an upright outer tab arranged to extend upwardly along and in spaced-apart relation to the vertical central axis and arranged to mate with the upright inner tab along an interface therebetween, and an upright fence arranged to interconnect the upright inner and outer tabs and surround the vertical central axis and configured to provide the second material segment having the second density and cooperate with the upright inner and outer tabs to form the sleeve.

3. The insulative sleeve of claim 2, wherein the upright inner tab includes an inner surface and an outer surface facing toward the upright outer tab, the upright outer tab includes an inner surface mating with the outer surface of the upright inner tab to define the interface between the upright inner and outer tabs, and the upright outer tab further includes an outer face facing away from the upright inner tab.

4. The insulative sleeve of claim 3, wherein each of the inner and outer surfaces of the upright inner and outer tabs has an arcuate shape in a horizontal cross-section and subtends an acute angle of less than 20 degrees.

5. The insulative sleeve of claim 2, wherein the upright fence includes an upright left side edge and an upright right side edge arranged to lie in spaced-apart confronting relation to the upright left side edge and the upright outer tab is configured to have the first density and mate with the upright inner tab to establish a bridge arranged to interconnect the upright left and right side edges of the upright fence and is formed of plastically deformed material having the first density.

6. The insulative sleeve of claim 2, wherein the upright fence has an inner surface facing toward the vertical central axis and an outer surface facing away from the vertical central axis and surrounding the inner surface of the upright fence and cooperating with the inner surface of the upright fence to define a first thickness therebetween, the upright inner tab includes an inner surface facing toward the vertical central axis and an outer surface facing toward the upright outer tab, the upright outer tab includes an inner surface facing toward the vertical central axis and mating with the outer surface of the upright inner tab to define the interface between the upright inner and outer tabs, and the upright outer tab further includes an outer face facing away from the upright inner tab, the inner and outer surfaces of the upright inner tab cooperate to define a second thickness therebetween that is about half of the first thickness, and the inner and outer surfaces of the upright outer tab cooperate to define a third thickness that is about half of the first thickness.

7. The insulative sleeve of claim 6, wherein the insulative cellular non-aromatic polymeric material has no fractures so that a predetermined insulative characteristic is maintained in the material.

8. The insulative sleeve of claim 2, wherein the sleeve further comprises a cellular non-aromatic graphics skin coupled to the insulative cellular non-aromatic polymeric material.

9. The insulative sleeve of claim 8, wherein the sleeve further comprises an adhesive interposed between the graphics skin and the insulative cellular non-aromatic polymeric material.

10. The insulative sleeve of claim 9, wherein ink is printed on the graphics skin to provide a graphic design.

11. The insulative sleeve of claim 8, wherein the graphics skin is biaxially oriented polypropylene.

12. The insulative sleeve of claim 8, wherein the strip of insulative cellular non-aromatic polymeric material has cells having an average cell aspect ratio in at least one direction in a range of about 1.0 to about 3.0.

13. The insulative sleeve of claim 12, wherein the second density is in a range of about 0.01 g/cm$^3$ to about 0.19 g/cm$^3$.

14. The insulative sleeve of claim 1, wherein the sleeve is arranged to surround a vertical central axis and includes an upright inner tab arranged to extend upwardly along and in spaced-apart relation to the vertical central axis and is configured to provide the first material segment having the first density, an upright outer tab arranged to extend upwardly along and in spaced-apart relation to the vertical central axis and arranged to mate with the upright inner tab along an interface therebetween, and an upright fence arranged to interconnect the upright inner and outer tabs and surround the vertical central axis and configured to provide the second material segment having the second density and cooperate with the upright inner and outer tabs to form the sleeve, wherein the sleeve further comprises a cellular non-aromatic graphics skin coupled to the insulative cellular non-aromatic polymeric material, and wherein the blowing agent comprises at least one of carbon dioxide, pentane, butane, and nitrogen.

15. The insulative sleeve of claim 14, wherein the polypropylene base resin is a polypropylene homopolymer resin.

16. The insulative sleeve of claim 15, further comprising a polypropylene secondary resin that is a polypropylene homopolymer resin.

17. The insulative sleeve of claim 15, further comprising a polypropylene secondary resin that is a polypropylene copolymer resin.

18. The insulative sleeve of claim 15, wherein the sheet of insulative cellular non-aromatic polymeric material has cells having an average cell aspect ratio in at least one direction in a range of about 1.0 to about 3.0.

19. The insulative sleeve of claim 18, wherein the second density is in a range of about 0.01 $g/cm^3$ to about 0.19 $g/cm^3$.

20. The insulative sleeve of claim 19, wherein the sleeve is arranged to surround a vertical central axis and includes an upright inner tab arranged to extend upwardly along and in spaced-apart relation to the vertical central axis and is configured to provide the first material segment having the first density, an upright outer tab arranged to extend upwardly along and in spaced-apart relation to the vertical central axis and arranged to mate with the upright inner tab along an interface therebetween, and an upright fence arranged to interconnect the upright inner and outer tabs and surround the vertical central axis and configured to provide the second material segment having the second density and cooperate with the upright inner and outer tabs to form the sleeve, and wherein the upright fence has an inner surface facing toward the vertical central axis and an outer surface facing away from the vertical central axis and surrounding the inner surface of the upright fence and cooperating with the inner surface of the upright fence to define a first thickness therebetween, the upright inner tab includes an inner surface facing toward the vertical central axis and an outer surface facing toward the upright outer tab, the upright outer tab includes an inner surface facing toward the vertical central axis and mating with the outer surface of the upright inner tab to define the interface between the upright inner and outer tabs, and the upright outer tab further includes an outer face facing away from the upright inner tab, the inner and outer surfaces of the upright inner tab cooperate to define a second thickness therebetween that is about half of the first thickness, and the inner and outer surfaces of the upright outer tab cooperate to define a third thickness that is about half of the first thickness.

21. The insulative sleeve of claim 1, wherein the blowing agent comprises at least one of carbon dioxide, pentane, and butane.

22. The insulative sleeve of claim 1, wherein the polypropylene base resin is a polypropylene homopolymer resin, the polypropylene base resin comprises broadly distributed molecular weight polypropylene characterized by a distribution that is unimodal, and the polypropylene base resin is characterized by long-chain branching to provide a predetermined balance of processability and elasticity.

23. The insulative sleeve of claim 1, wherein the polypropylene secondary resin is a polypropylene homopolymer resin.

24. The insulative sleeve of claim 1, wherein the polypropylene secondary resin is a polypropylene copolymer resin.

25. The insulative sleeve of claim 1, wherein the sheet of insulative cellular non-aromatic polymeric material has cells having an average cell aspect ratio in at least one direction in a range of about 1.0 to about 3.0.

26. The insulative sleeve of claim 1, wherein the second density is in a range of about 0.01 $g/cm^3$ to about 0.19 $g/cm^3$.

27. The insulative sleeve of claim 26, wherein the second density is in a range of about 0.05 $g/cm^3$ to about 0.19 $g/cm^3$.

28. The insulative sleeve of claim 27, wherein the sleeve is arranged to surround a vertical central axis and includes an upright inner tab arranged to extend upwardly along and in spaced-apart relation to the vertical central axis and is configured to provide the first material segment having the first density, an upright outer tab arranged to extend upwardly along and in spaced-apart relation to the vertical central axis and arranged to mate with the upright inner tab along an interface therebetween, and an upright fence arranged to interconnect the upright inner and outer tabs and surround the vertical central axis and configured to provide the second material segment having the second density and cooperate with the upright inner and outer tabs to form the sleeve, and wherein the upright fence has an inner surface facing toward the vertical central axis and an outer surface facing away from the vertical central axis and surrounding the inner surface of the upright fence and cooperating with the inner surface of the upright fence to define a first thickness therebetween, the upright inner tab includes an inner surface facing toward the vertical central axis and an outer surface facing toward the upright outer tab, the upright outer tab includes an inner surface facing toward the vertical central axis and mating with the outer surface of the upright inner tab to define the interface between the upright inner and outer tabs, and the upright outer tab further includes an outer face facing away from the upright inner tab, the inner and outer surfaces of the upright inner tab cooperate to define a second thickness therebetween that is about half of the first thickness, and the inner and outer surfaces of the upright outer tab cooperate to define a third thickness that is about half of the first thickness.

* * * * *